（12）United States Patent
Visel

(10) Patent No.: US 8,473,449 B2
(45) Date of Patent: Jun. 25, 2013

(54) PROCESS OF DIALOGUE AND DISCUSSION

(75) Inventor: Thomas A. Visel, Austin, TX (US)

(73) Assignee: Neuric Technologies, LLC, Houston, TX (US)

( * ) Notice: Subject to any disclaimer, the term of this patent is extended or adjusted under 35 U.S.C. 154(b) by 585 days.

(21) Appl. No.: 12/645,317

(22) Filed: Dec. 22, 2009

(65) Prior Publication Data
US 2010/0185437 A1 Jul. 22, 2010

Related U.S. Application Data

(63) Continuation-in-part of application No. 11/758,667, filed on Jun. 5, 2007, now Pat. No. 7,925,492, which is a continuation-in-part of application No. 11/697,721, filed on Apr. 7, 2007, now Pat. No. 8,001,067, which is a continuation-in-part of application No. 11/670,959, filed on Feb. 2, 2007, now abandoned, which is a continuation-in-part of application No. 11/425,688, filed on Jun. 21, 2006, now Pat. No. 7,849,034, which is a continuation of application No. 11/154,313, filed on Jun. 16, 2005, now Pat. No. 7,089,218, which is a continuation of application No. 11/030,452, filed on Jan. 6, 2005, now abandoned.

(60) Provisional application No. 61/140,005, filed on Dec. 22, 2008.

(51) Int. Cl.
*G06F 17/00* (2006.01)
*G06N 7/00* (2006.01)
*G06N 7/08* (2006.01)

(52) U.S. Cl.
USPC .......................................................... 706/55

(58) Field of Classification Search
USPC ........................................................... 706/55
See application file for complete search history.

(56) References Cited

U.S. PATENT DOCUMENTS 4,884,972 A 12/1989 Gasper
5,040,214 A 8/1991 Grossberg et al.
(Continued)

FOREIGN PATENT DOCUMENTS

EP 1 006 452 A2 6/2002
JP 2000-259597 9/2000
WO 2007/081307 A1 7/2007

OTHER PUBLICATIONS

Barba, R. The Sims: Prima's Official Strategy Guide. Prima Publishing, Roseville, CA. 2000.

(Continued)

Primary Examiner — Omar F Fernandez Rivas
Assistant Examiner — Ababacar Seck
(74) Attorney, Agent, or Firm — Howison & Arnott, L.L.P.

(57) ABSTRACT

A method for effecting a dialogue with an emulated brain. The method includes the step of receiving a query in the form of a semantic string. The semantic string is then parsed into basic concepts of the query. The basic concepts are then clumped into a clump concept. If the clump concept constitutes part of a dialogue, then the dialogue thread is activated by determining the context of the clump concept and assessing a potential reply from a group of weighted replies, which expected replies are weighted based on the parsed concepts produced in the step of parsing. The heaviest weighted one of the expected replies is selected and the weight of the selected reply after it is selected is downgraded. The selected reply is then generated for output in a sentence structure.

5 Claims, 8 Drawing Sheets

U.S. PATENT DOCUMENTS

| | | | |
|---|---|---|---|
| 5,170,381 | A | 12/1992 | Taylor et al. |
| 5,179,631 | A | 1/1993 | Guddanti et al. |
| 5,214,715 | A | 5/1993 | Carpenter et al. |
| 5,253,328 | A | 10/1993 | Hartman |
| 5,325,464 | A | 6/1994 | Pechanek et al. |
| 5,371,807 | A | 12/1994 | Register et al. |
| 5,406,956 | A | 4/1995 | Farwell |
| 5,412,256 | A | 5/1995 | Alspector et al. |
| 5,504,839 | A | 4/1996 | Mobus |
| 5,515,477 | A | 5/1996 | Sutherland |
| 5,564,115 | A | 10/1996 | Clarkson |
| 5,649,065 | A | 7/1997 | Lo et al. |
| 5,671,425 | A | 9/1997 | Suematsu |
| 5,687,286 | A | 11/1997 | Bar-Yam |
| 5,721,938 | A | 2/1998 | Stuckey |
| 5,918,222 | A | 6/1999 | Fukui et al. |
| 5,920,852 | A | 7/1999 | Graupe |
| 5,960,384 | A | 9/1999 | Brash |
| 5,995,651 | A | 11/1999 | Gelenbe et al. |
| 6,014,653 | A | 1/2000 | Thaler |
| 6,081,774 | A | 6/2000 | De Hita et al. |
| 6,098,033 | A | 8/2000 | Richardson et al. |
| 6,108,619 | A | 8/2000 | Carter et al. |
| 6,230,111 | B1 | 5/2001 | Mizokawa |
| 6,269,368 | B1 | 7/2001 | Diamond |
| 6,317,700 | B1 | 11/2001 | Bagne |
| 6,330,537 | B1 | 12/2001 | Davis et al. |
| 6,353,810 | B1 | 3/2002 | Petrushin |
| 6,405,199 | B1 | 6/2002 | Carter et al. |
| 6,415,257 | B1 | 7/2002 | Junqua et al. |
| 6,513,006 | B2 | 1/2003 | Howard et al. |
| 6,584,464 | B1 | 6/2003 | Warthen |
| 6,601,026 | B2 | 7/2003 | Appelt et al. |
| 6,611,841 | B1 | 8/2003 | Han |
| 6,629,242 | B2 | 9/2003 | Kamiya et al. |
| 6,731,307 | B1 | 5/2004 | Strubbe et al. |
| 6,778,970 | B2 | 8/2004 | Au |
| 6,795,808 | B1 | 9/2004 | Strubbe et al. |
| 6,826,568 | B2 | 11/2004 | Bernstein et al. |
| 6,842,877 | B2 | 1/2005 | Robarts et al. |
| 6,871,174 | B1 | 3/2005 | Dolan et al. |
| 6,871,199 | B1 | 3/2005 | Binnig et al. |
| 6,901,390 | B2 | 5/2005 | Mizokawa |
| 7,027,974 | B1 | 4/2006 | Busch et al. |
| 7,089,218 | B1 | 8/2006 | Visel |
| 7,113,848 | B2 | 9/2006 | Hanson |
| 7,249,117 | B2 | 7/2007 | Estes |
| 7,363,108 | B2 | 4/2008 | Noda et al. |
| 7,379,568 | B2 | 5/2008 | Movellan et al. |
| 7,389,225 | B1 | 6/2008 | Jensen et al. |
| 7,475,008 | B2 | 1/2009 | Jensen et al. |
| 7,562,011 | B2 | 7/2009 | Carter et al. |
| 7,584,099 | B2 | 9/2009 | Ma et al. |
| 7,653,530 | B2 | 1/2010 | Carter et al. |
| 7,707,135 | B2 | 4/2010 | Bridges et al. |
| 7,734,562 | B1 | 6/2010 | Hairman |
| 7,831,426 | B2 | 11/2010 | Bennett |
| 2001/0001318 | A1 | 5/2001 | Kamiya et al. |
| 2001/0041980 | A1 | 11/2001 | Howard et al. |
| 2001/0056427 | A1 | 12/2001 | Yoon et al. |
| 2002/0087346 | A1 | 7/2002 | Harkey |
| 2003/0049589 | A1 | 3/2003 | Feldhake |
| 2003/0055654 | A1 | 3/2003 | Oudeyer |
| 2003/0093280 | A1 | 5/2003 | Oudeyer |
| 2003/0101151 | A1 | 5/2003 | Holland |
| 2003/0103053 | A1 | 6/2003 | Stephany et al. |
| 2003/0110026 | A1 | 6/2003 | Yamamoto |
| 2003/0115165 | A1 | 6/2003 | Hoya |
| 2003/0130837 | A1 | 7/2003 | Batchilo et al. |
| 2003/0182123 | A1 | 9/2003 | Mitsuyoshi |
| 2003/0191627 | A1 | 10/2003 | Au |
| 2003/0220890 | A1 | 11/2003 | Okude |
| 2003/0234871 | A1 | 12/2003 | Squilla et al. |
| 2004/0006566 | A1 | 1/2004 | Taylor et al. |
| 2004/0039483 | A1 | 2/2004 | Kemp et al. |
| 2004/0054636 | A1 | 3/2004 | Tango-Lowy |
| 2004/0138936 | A1 | 7/2004 | Johnson et al. |
| 2004/0138959 | A1 | 7/2004 | Hlavac et al. |
| 2004/0139040 | A1 | 7/2004 | Nervegna et al. |
| 2004/0175680 | A1 | 9/2004 | Hlavac et al. |
| 2004/0177051 | A1* | 9/2004 | Bridges et al. .................. 706/11 |
| 2004/0181427 | A1 | 9/2004 | Stobbs et al. |
| 2004/0186743 | A1 | 9/2004 | Cordero, Jr. |
| 2004/0189702 | A1 | 9/2004 | Hlavac et al. |
| 2004/0193420 | A1 | 9/2004 | Kennewick et al. |
| 2004/0205035 | A1 | 10/2004 | Rimoux |
| 2004/0243281 | A1 | 12/2004 | Fujita et al. |
| 2004/0243529 | A1 | 12/2004 | Stoneman |
| 2004/0243568 | A1 | 12/2004 | Wang et al. |
| 2004/0249510 | A1 | 12/2004 | Hanson |
| 2005/0004936 | A1 | 1/2005 | Potapov et al. |
| 2005/0010416 | A1 | 1/2005 | Anderson et al. |
| 2005/0015351 | A1 | 1/2005 | Nugent |
| 2005/0062743 | A1 | 3/2005 | Marschner et al. |
| 2005/0090935 | A1 | 4/2005 | Sabe et al. |
| 2005/0102246 | A1 | 5/2005 | Movellan et al. |
| 2005/0143138 | A1 | 6/2005 | Lee et al. |
| 2005/0197739 | A1 | 9/2005 | Noda et al. |
| 2005/0216121 | A1 | 9/2005 | Sawada et al. |
| 2005/0256889 | A1 | 11/2005 | McConnell |
| 2006/0149692 | A1 | 7/2006 | Hercus |
| 2006/0167694 | A1 | 7/2006 | Mitsuyoshi |
| 2007/0156625 | A1 | 7/2007 | Visel |
| 2007/0250464 | A1 | 10/2007 | Hamilton |
| 2007/0282765 | A1 | 12/2007 | Visel et al. |
| 2007/0288406 | A1 | 12/2007 | Visel |
| 2008/0228467 | A1 | 9/2008 | Womack et al. |
| 2008/0243741 | A1 | 10/2008 | Visel et al. |
| 2008/0300841 | A1 | 12/2008 | Visel |
| 2010/0042566 | A1 | 2/2010 | Visel |
| 2010/0042567 | A1 | 2/2010 | Visel |
| 2010/0042568 | A1 | 2/2010 | Visel |
| 2010/0088262 | A1 | 4/2010 | Visel et al. |

OTHER PUBLICATIONS

Bickmore, Timothy, Linda Cook, Elizabeth Churchill and Joseph Sullivan, "Animated Autonomous Personal Representatives;" International Conference on Autonomous Agents Proceedings of the Second International Conference on Autonomous Agents; 1998.

Breazeal, C. and Aryananda, L. 2002. Recognition of Affective Communicative Intent in Robot-Directed Speech. Autonomous Robots 12, 1 (Jan. 2002), 83-104.

Breazeal, C. and Scassellati, B. 1999. A Context-Dependent Attention System for a Social Robot. In Proceedings of the Sixteenth international Joint Conference on Artificial Intelligence (Jul. 31-Aug. 6, 1999). T. Dean, Ed. Morgan Kaufmann Publishers, San Francisco, CA, 1146-1153.

Breazeal, C., "A motivational system for regulating human-robot interaction," in Proceedings of the Fifteenth National Conference on Artificial Intelligence (AAAI98), Madison, WI, pp. 54-61. Jul. 26-30, 1998.

Breazeal, C., Scassellati, B., How to build robots that make friends and influence people. Intelligent Robots and Systems, 1999. IROS '99. Proceedings. 1999 IEEE/RSJ International Conference on. vol. 2, Oct. 17-21, 1999 pp. 858-863.

Breazeal, Cynthia and Brian Scassellati "Infant-like Social Interactions between a Robot and a Human Caregiver", MIT, 2000; pp. 1-57.

Fong, T., Nourbakhsh, I., Dautenhahn, K. A survey of socially interactive robots: concepts, design and applications, Technical Report No. CMU-RI-TR-02-29, Robotics Institute, Carnegie Mellon University, 2002.

Halici, U. "Reinforcement learning in random neural networks for cascaded decisions" BioSystems 40. Elsevier. 1997.

Lehmann, T. et al. "On-chip Learning in Pulsed Silicon Neural Networks" 1997 IEEE International Symposium on Circuits and Systems, Hong Kong. Jun. 9-12, 1997.

Matthew J. Marjanovic. Teaching an Old Robot New Tricks: Learning Novel Tasks via Interaction with People and Things. MIT AI Lab. AI Technical Report 2003-013. Jun. 2003.

McCallum, A.K. "Reinforcement Learning with Selective Perception and Hidden State" Dissertation, University of Rochester, Rochester, New York. 1996.

Pantic, Maja et al., "Toward an affect-sensitive multimodal human-computer interaction." in Proceedings of the IEEE, vol. 91, Issue 9, p. 1370-139, Sep. 2003 [retrieved on Oct. 12, 2007]. Retrieved from the Internet: <URL:http://http://www.kbs.twi.tudelft.nl/docs/journal/Pantic.M-ProcIEEE2003.pdf>.

PCT: International Preliminary Report on Patentability of PCT/US2006/000229 (related application); Jul. 17, 2008; 5 pgs.

PCT: International Preliminary Report on Patentability of PCT/US2007/061580 (related application); Aug. 14, 2008; 7 pgs.

PCT: International Preliminary Report on Patentability of PCT/US2008/072243 (related application); Feb. 18, 2010; 6 pgs.

PCT: International Search Report and Written Opinion of PCT/US2006/000229 (related application); Jun. 22, 2006; 7 pgs.

PCT: International Search Report and Written Opinion of PCT/US2007/061580 (related application); Mar. 4, 2008; 8 pgs.

PCT: International Search Report and Written Opinion of PCT/US2008/072243 (related application); Feb. 27, 2009; 7 pgs.

Ushida, H., Hirayama, Y., and Nakajima, H. 1998. Emotion model for life-like agent and its evaluation. In Proceedings of the Fifteenth National/Tenth Conference on Artificial intelligence/innovative Applications of Artificial intelligence (Madison, Wisconsin, United States). American Association for Artificial Intelligence, Menlo Park, CA, 62-69.

Witkowski, C.M. "Schemes for Learning and Behavior: A New Expectancy Model" Dissertation, University of London. Feb. 1997.

Claverol, E.T. et al. "Discrete simulation of large aggregates of neurons". Neurocomputing 47 (2002) pp. 277-297.

Franzmeier, M. et al. "Hardware Accelerated Data Analysis". Proceedings of the International Conference on Parallel Computing in Electrical Engineering (PARELEC'04). Sep. 2004. 6 pages.

Kosko, B. "Adaptive bidirectional associative memories". Applied Optics, vol. 26, No. 23. Dec. 1, 1987. pp. 4947-4960.

Sato, Y. et al. "Development of a High-Performance, General Purpose Neuro-Computer composed of 512 Digital Neurons". Proceedings of 1993 International Joint Conference on Neural Networks. 1993. pp. 1967-1970.

Matuszek, Basic Object Oreiented Concepts, 2002, Retrieved from the Internet:<www.cis.upenn.edu/-matuszek/cit591-2002/ Lectures/objects-concepts.ppt>.

* cited by examiner

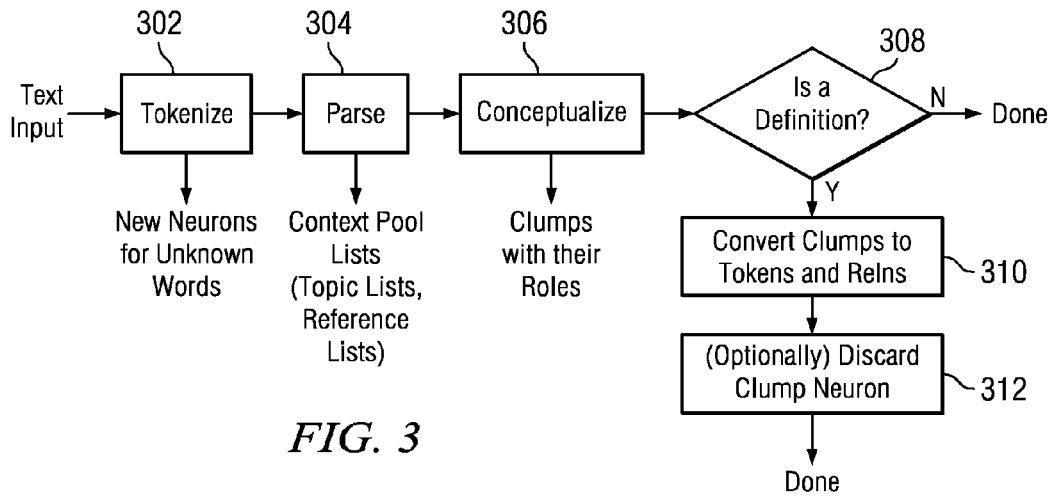

FIG. 3

Assess Level of Needed Detail
  His temperament,
  His imperative ("Tell me more detail!")
  My expectations of him (using his Xpt blocks)

Form the Outline
  Investigate Reln types in some specific order
    CAT_MEMB_OF   (general)
    PARENT        -
    INSTANCE      -
    CHILD         (very specific)

Follow the Outline

Form a Summary

Obtain and Assess Feedback
  Need more information?
    "Yes, elaborate on dogs."
Done List of Items (in outline)
"domestic animal"  (CAT_MEMB_OF)
"companion pet"    (CAT_MEMB_OF)
"canine"           (PARENT)
"Fido"             (INSTANCE)

FIG. 4

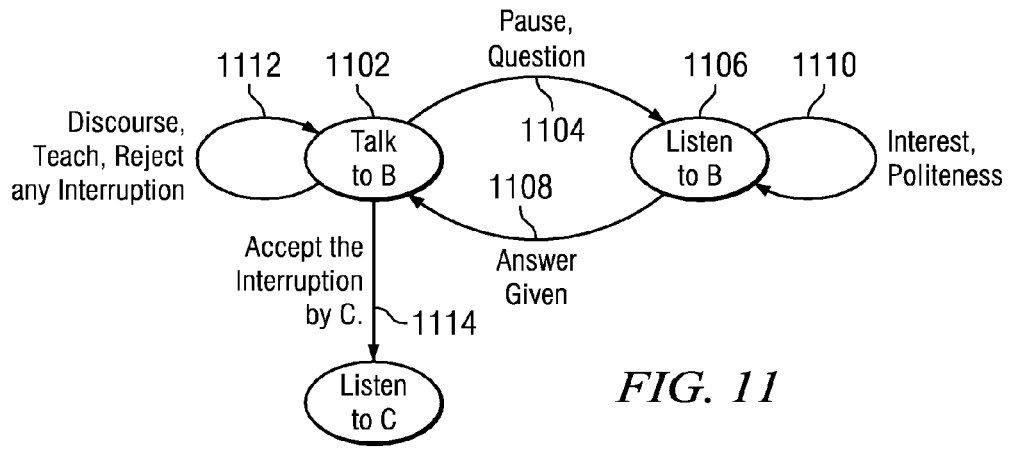

FIG. 11

| To show you are... | Say: |
|---|---|
| Interested in hearing more | Tell me more. What was <that> like for you? |
| Taking it all in | Hmmm, I see... |
| Responding positively | How interesting! What an <accomplishment>! |
| Diverging | On the other hand, what do you think? |
| Expanding upon the idea | Along the same line, do you <verb_topic>? Why? |
| Arguing, refuting | What proof do you have of that? |
| Involving yourself | Could I do that? What would it mean to me? |
| Clarifying | I'm not sure I'm clear on your feelings about <topic>. |
| Empathizing | That must have been <tough, frustrating, disappointing>. |
| Probing | What do you mean by that? |
| Seeking specifics | Can you give me an example? |
| Seeking generalities | What's the big picture here? |
| Looking to the future | What do you think will happen next? |
| Reviewing the past | What happened first? |
| Seeking likeness | Have you ever seen anything like this? |
| Seeking differences | What's the opposing point of view? |
| Seeking extremes | What's the downside? |
| Seeking contrasts | What's the optimum <approach, outcome, method>? |

FIG. 12

PROCESS OF DIALOGUE AND DISCUSSION

CROSS-REFERENCE TO RELATED APPLICATIONS

This application claims the benefit of U.S. Provisional Application for Patent Ser. No. 61/140,005, filed Dec. 22, 2008, and entitled PROCESS OF DIALOGUE AND DISCUSSION, the specification of which is incorporated herein in its entirety.

This application is a continuation-in-part application of U.S. application Ser. No. 11/758,667, filed Jun. 5, 2007, and entitled METHOD FOR DETERMINING RELATIONSHIPS THROUGH USE OF AN ORDERED LIST BETWEEN PROCESSING NODES IN AN EMULATED HUMAN BRAIN.

U.S. application Ser. No. 11/758,667 is a Continuation-in-Part of pending U.S. patent application Ser. No. 11/697,721, filed Apr. 7, 2007, and entitled METHOD FOR SUBSTITUTING AN ELECTRONIC EMULATION OF THE HUMAN BRAIN INTO AN APPLICATION TO REPLACE A HUMAN.

U.S. application Ser. No. 11/697,721 is a Continuation-in-Part of pending U.S. patent application Ser. No. 11/670,959, filed Feb. 2, 2007, and entitled METHOD FOR MOVIE ANIMATION.

U.S. patent application Ser. No. 11/670,959 is a Continuation-in-Part of pending U.S. patent application Ser. No. 11/425,688, filed Jun. 21, 2006, and entitled A METHOD FOR INCLUSION OF PSYCHOLOGICAL TEMPERAMENT IN AN ELECTRONIC EMULATION OF THE HUMAN BRAIN.

U.S. patent application Ser. No. 11/425,688 is a Continuation of U.S. application Ser. No. 11/154,313, filed Jun. 16, 2005, and entitled METHOD FOR INCLUSION OF PSYCHOLOGICAL TEMPERAMENT IN AN ELECTRONIC EMULATION OF THE HUMAN BRAIN, now U.S. Pat. No. 7,089,218, issued Aug. 8, 2006.

U.S. Pat. No. 7,089,218 is a Continuation of abandoned U.S. application Ser. No. 11/030,452, filed Jan. 6, 2005, and entitled A METHOD FOR INCLUSION OF PSYCHOLOGICAL TEMPERAMENT IN AN ELECTRONIC EMULATION OF THE HUMAN BRAIN.

This application further is related to U.S. patent application Ser. No. 12/344,312, filed on Dec. 26, 2008 and entitled, "DISCUSSION PATENT." This application is also related to U.S. patent application Ser. No. 12/136,670, entitled METHOD AND APPARATUS FOR DEFINING AN ARTIFICIAL BRAIN VIA A PLURALITY OF CONCEPT NODES CONNECTED TOGETHER THROUGH PREDETERMINED RELATIONSHIPS, filed on Jun. 10, 2008.

All of the above are incorporated herein by reference in their entireties.

SUMMARY

The present disclosure provides a method for effecting a dialogue with an emulated brain. The method includes the step of receiving a query in the form of a semantic string. The semantic string is then parsed into basic concepts of the query. The basic concepts are then clumped into a clump concept. If the clump concept constitutes part of a dialogue, then the dialogue thread is activated by determining the context of the clump concept and assessing a potential reply from a group of weighted replies, which expected replies are weighted based on the parsed concepts produced in the step of parsing. The heaviest weighted one of the expected replies is selected and the weight of the selected reply after it is selected is downgraded. The selected reply is then generated for output in a sentence structure.

BRIEF DESCRIPTION OF THE DRAWINGS

For a more complete understanding, reference is now made to the following description taken in conjunction with the accompanying Drawings in which:

FIG. 3 illustrates a flow diagram of parse and conceptualization of the emulated brain;

FIG. 4 illustrates a block diagram detailing the flow of monologue;

FIG. 11 illustrates a generalized state diagram for discussion;

FIG. 12 illustrates a table of possible feedback lines;

DETAILED DESCRIPTION

Figure 1:
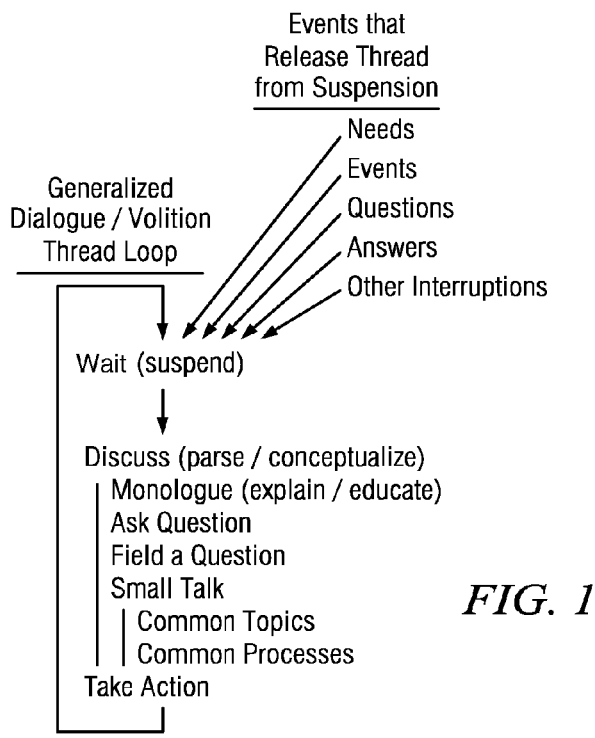
FIG. 1 illustrates a generalized volition-and-discussion thread.

Referring now to the drawings, wherein like reference numbers are used herein to designate like elements throughout, the various views and embodiments of a method of the process of dialogue and discussion are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Volition and Dialogue

In the modeling of a brain, the concepts of dialogue and volition (free will) are intertwined, together serving to control overall operations within the brain. They are implemented as an independent thread in the overall model of an emulated brain and use a parser, analyzer, speech construction block (hereinafter referred to as "Fonx") and other constituent blocks, described hereinbelow, as tools and systems that are subservient to volition.

Communications with other people has many facets, several of which are:

Monologue—One-sided conversation with another person, generally to inform or educate. It us used to relate knowledge, opinion and feelings to another person.

Dialogue—Two-sided conversation with one or more people. It involves making assertions or statements, and asking or answering questions. The nature of questions is that they may both be asked and may be fielded (answered).

As will be described hereinabelow, both monologue and dialogue are included under the general heading of discussion, and presume underlying volition, free will. In actual fact perhaps 8 separate types of dialogue are initially defined and supported, including formalized debate.

Some Drivers of Discussion

Were there nothing to drive discussion, the brain would largely sit silently. Things such as physical or emotional needs, expectations, experience, external events and the occurrence of timing-driven events serve as drivers for discussion.

Discussion is handled by an independent thread of control within the emulated brain. It largely sits idle, waiting for something to do. In the emulated brain, the idle condition is interrupted by certain events or conditions internal or external to the brain. The thread then conducts activity that carries out some aspect of volition and then returns idle.

Referring now to FIG. 1, there is illustrated the generalized volition-and-discussion thread. This generally is a loop. It is initiated in a "wait" state, which is a state wherein the brain the is in a suspend mode. This mode will be exited whenever some type of release event occurs. This will be the result of some "need," some predetermined event, questions that are asked, answers that are received, or other interruptions that indicate an input that is part of a dialogue. In general, any kind of discussion flow will begin from this state or the beginning of a discussion. The beginning of the discussion is the concept of parsing the input and conceptualizing the initial part of a discussion. This can be in the form of a monologue, which is basically a one-way conversation to inform or educate; it could be a question that is posed to an individual; and/or it could be an answer to a question that, after either the question is asked or the question is answered, then the system will loop back to the suspend mode, i.e., this is the action it takes in order to wait for an answer or to wait for the next question.

Figure 2:
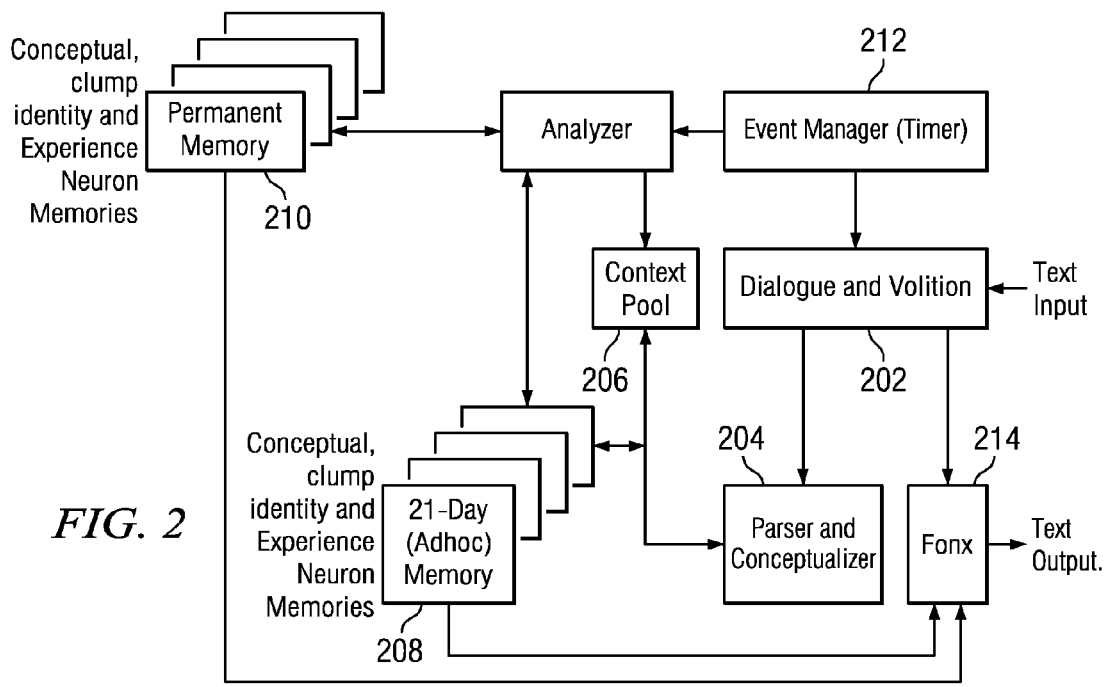
FIG. 2 illustrates and overall system block diagram.

Referring now to FIG. 2, there is illustrated an overall system block diagram of the emulated brain, which is a general diagram showing the placement of some key elements. This is described in more detail in U.S. patent Ser. No. 12/569,695, filed Sep. 29, 2009, entitled EMULATED BRAIN, which is incorporated herein by reference in its entirety. The basic unit is the "neuron." As stated in the incorporated references, the emulated brain utilizes a one-neuron-one concept. This means that everyone neuron in the system is a placeholder for a single concept. The neuron is built from a contiguous block of digital memory and is composed of a short header block and an extendable list of connections to other neurons. Each such connection item is called a "relational connection" or "reln," and each such reln has a connection type encoded in it. These relns are described in U.S. patent application Ser. No. 12/136,670, filed Jun. 10, 2008, and entitled METHOD AND APPARATUS FOR DEFINING AN ARTIFICIAL BRAIN VIA A PLURALITY OF CONCEPT NODES CONNECTED TOGETHER THROUGH PREDETERMINED RELATIONSHIPS, which is incorporated herein by reference in its entirety. A textual input is received in a dialogue and volition block 202, which is operable to pass the information to a parser and conceptualizer 204. The parser dissects incoming text, extracting basic kernel information from each sentence, such as the verbs, subjects, etc. The intention of the parser is not to permit one to memorize the sentence, but to permit one to move into a conceptual realm. In general, it performs some form of semantic grammar analysis on the sentence and the sentence elements in some orderly manner. Input to the parser is a set of "tokens" previously extracted from the sentence. These are neuron IDs for either words or punctuation elements and provided to it as a tree-like list. Out from the parser is another tree-like list that represents those likely parse option paths for the given sentence. The conceptualizer portion of the block 204 subsequently converts the list into one or more clump neurons and zero or more complex neural neurons. This is generally illustrated in FIG. 3.

In FIG. 3, a tokenizing block is illustrated by a block 302, which receives the text input and determines if a particular word or such has an existing neuron associated therewith. If not, the tokenizing block 302 will create new neurons for new and unknown words. The parsing operation is illustrated by block 304, which is operable to parse the sentence into context pool lists. These are lists of neurons that refer to such things as topics and references, which are placed in a context pool memory 206. The context pool memory 206 defines neurons that are associated with a situational context of a present input. This context pool is described in U.S. patent application Ser. No. 11/425,688, filed Jun. 21, 2006, and entitled A METHOD FOR INCLUSION FOR PSYCHOLOGICAL TEMPERAMENT IN AN ELECTRONIC EMULATION OF THE HUMAN BRAIN, which is incorporated herein by reference in its entirety. A dedicated thread of execution will handle the parse phase from beginning to end such that the first step is to pass the sentence to the tokenizer system 302 to convert the text to the neuron ID and punctuation tokens, and then parse the token tree into a conceptual output tree. This will be followed by the conceptualize operation, wherein the parser output tree is conceptualized into the needed clumps and neurons, which sometimes can involve any open items such as pronouns. The results of a parse operation may sometimes last for twenty days or so (or any other type of long duration) if the results are not revalidated or otherwise affirmed as topical and important. During this time, the neurons are stored in an ad hoc memory 208. All of the temporary/ad hoc neurons stored in the memory 208 are aged with a sleep process to determine if the neuron should die, i.e., they have not been reinforced for a certain period of time. Once the neurons have been disposed of in the ad hoc memory and have been reinforced a number of times, they will be passed to a permanent or long-term memory 210. These will result in the identity and experience neurons. All of these operations are managed by an event timer 212 with an analyzer that analyzes the neurons stored in the context pool, which overlap the neurons stored in the ad hoc memory 208.

Both the neurons stored in the ad hoc memory 208 and the neurons stored in the permanent memory 210 are provided as input to the Fonx block 214. This is a subsystem that provides a centralized method for converting clump-based information into sentences. It is capable of expressing the same basic information in one of seven different sentence styles. These include several forms of active voice, passive voices, confirmation, questions, and other styles. There are six basic formats for questions alone. The Fonx subsystem is a relatively low-level operation called upon by many other subsystems to regenerate text from concepts. It is emotion-capable and alters word usage based upon emotional nuance. The handling of some forms, such a "modal" words of obligation, permission, desire, and the such is done in "right-time" such that the most suitable form of expression is used. The same holds true with the use of intensifiers such as "very" or "almost."

In general, the parser and conceptualizer shown in FIG. 3 is a controllable subsystem by the discussion logic. The general flow provides outputs at each step such that new neurons can be output by the tokenize block 302, context pool lists can be created by the parser at 304, and clumps with their roles can be produced by the conceptualize block 306. The output of the conceptualize block can be analyzed to determine if the clumps constitute a definition. If not, then the parser and conceptualizer operation is complete, as determined by decision block 308. If it is a definition, then the clumps will be converted to tokens and reins, as indicated by block 310 and then optionally discarded as indicated by block 312.

Creation of Monologue (Educational Content)

The monologue form of discussion is one-sided conversation for the purpose of describing an object, a position or to convey other knowledge.

The general form of monologue includes the following traditional steps: 1) Outline what you are going to say; 2) Say it; and 3) Summarize what you just said.

The same process is applied whether one is speaking a paragraph, a short paper or a treatise or book. At each level, whether it be upper synopsis, chapters, sections, pages or paragraphs, the same general mechanism is applied. The above process is therefore suitable for recursively refining and detailing the content of the monologue. Regardless of the topic of discussion, it is possible to start anywhere within the memory structure and effectively write a treatise on any topic. Methods will be described herein below to establish how much information one can create. In a discussion, one is limited in their ability to discuss a subject only by the amount of material available. FIG. 4 illustrates the detailed flow of the internal process of monologue.

FIG. 4 illustrates the flow as beginning at a first point wherein an assessment is made as to the level of needed detail.

The level of detail to be given is based upon intent and other factors, such as the speaker's temperament, imperatives and the expectations of the speaker based upon Experience blocks. Generally speaking, the level of detail and quantity of information are readily controlled by restricting how far the system searches for related neurons, such as how far up the parental lineage chain the outline will progress (if there is one!)

Topical content for the initial outline of what to speak about is obtained by looking at reins that connect to the base topic. It is known that certain relns connect to very general information, while others point to either generic or very specific types. Top-level outlines pull neuron IDs (NIDs) from relns on the topic neuron by order of type and save them in a list. This list is then used as the outline.

At each stage of the monologue, lists can be used with the Fonx subsystem to create sentences on the topic items. These sentences communicate specific types of information about the NIDs based upon the type of the reln used to connect them.

Consider this outline paragraph produced from the dog neuron: A dog is a domestic animal and often a companion pet. They are members of the canine family. I have one whose name is Fido.

Using the above monologue technique, the above example is very easy to obtain.

Noted in FIG. 4, some items appearing in this paragraph were obtained in the following ways: "domestic animal" came from a CAT_MEMB_OF reln; "companion pet" came from a CAT_MEMB_OF reln; "canine" came from a PARENT reln; and/or "Fido" came from an INSTANCE reln.

Figure 5:
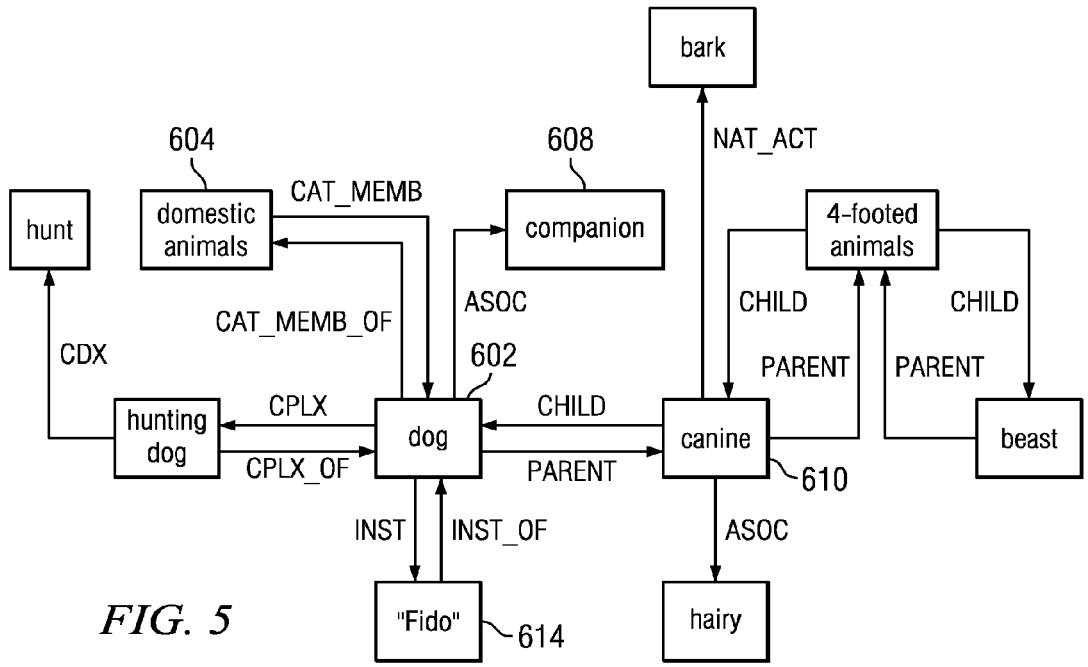
FIG. 5 illustrates the relationships between the various neurons.

The neuron data used to obtain the above paragraph is given in FIG. 5. It shows the relationships between the various neurons that could be referenced during the above culls, showing that not all were included. The paragraph begins with the dog neuron 602, which has various relationships associated therewith. For example, the dog is a member of the domestic animals categories, neuron 604, and has an associative relationship with a companion neuron 608. Therefore, the dog is a domestic animal and is often associated with being a companion. Also, the has a parent-child relationship with a canine neuron 610, which points to the canine neuron as being a parent thereto, wherein the canine neuron 610 points to the dog neuron 602 as being a child neuron. Therefore, the dog is a member of the canine family. There is an instance neuron 614, which is the "Fido" neuron that indicates that one instance of the dog is Fido. Therefore, that sets the last sentence of the paragraph. Each neuron has multiple relationships and further scans can be made to determine other information about the dog.

Extended scans for other reln types yield different (or additional) neurons for inclusion in the summary.

The Dialogue of Personal Introduction

The thread is normally suspended, awaiting an interruption by some external condition or event. When released to operate, what is performed is a function of those external conditions or events. One such event is the awareness of a personal introduction just given, such as, "Hi, I'm Jack!"

Figure 6:
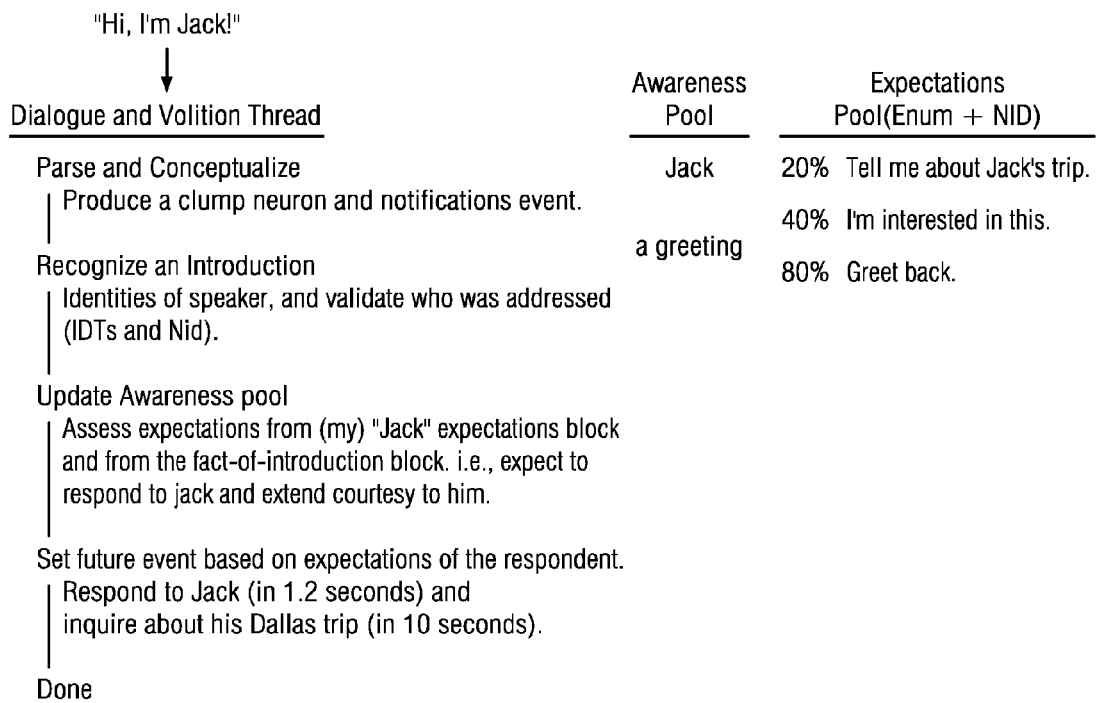
FIG. 6 illustrates a flow diagram for dialogue introduction.

The fact that an introduction was just volunteered by the other speaker (the "respondent") is discovered by the parser, and an event is issued for the situation. In this FIG. 6, the dialogue and volition thread is initialized and the sentences parsed and conceptualized to produce a clump neuron and a notification of the event. In general, as discussed in U.S. patent Ser. No. 12/344,312, filed Dec. 26, 2008, and entitled DISCUSSION PATENT, which is incorporated herein by reference in its entirety, there is discussed the dialogue aspect that utilizes and awareness pool and expectation pool. In this awareness pool, there is an awareness of Jack speaking There is also and awareness that this is a greeting. Based upon that, there is a fixed expectations pool about the dialogue that will be ranked based upon the terminology. There will be an expectation of 80% that the dialogue will require the recipient of the dialogue to provide a greeting back; there will be an expectation that the recipient will indicate some interest in what Jack is doing; and there will be an expectation, which is low, about something to do with a trip of Jack. By parsing and conceptualizing the sentence producing clump neurons and then recognizing it as an introduction, i.e., it identifies the speaker and validates who is addressed and then it updates the awareness pool. This updating is a form of assessing the expectations from the Jack expectations block and also from the fact-of-introduction block, i.e., there is an expectation to respond to Jack and extend courtesy to him. Thereafter, a future event is set based on expectations of the respondent, the expectation being either to respond to Jack in a certain period or to inquire about some trip in another period of time.

Figure 7:
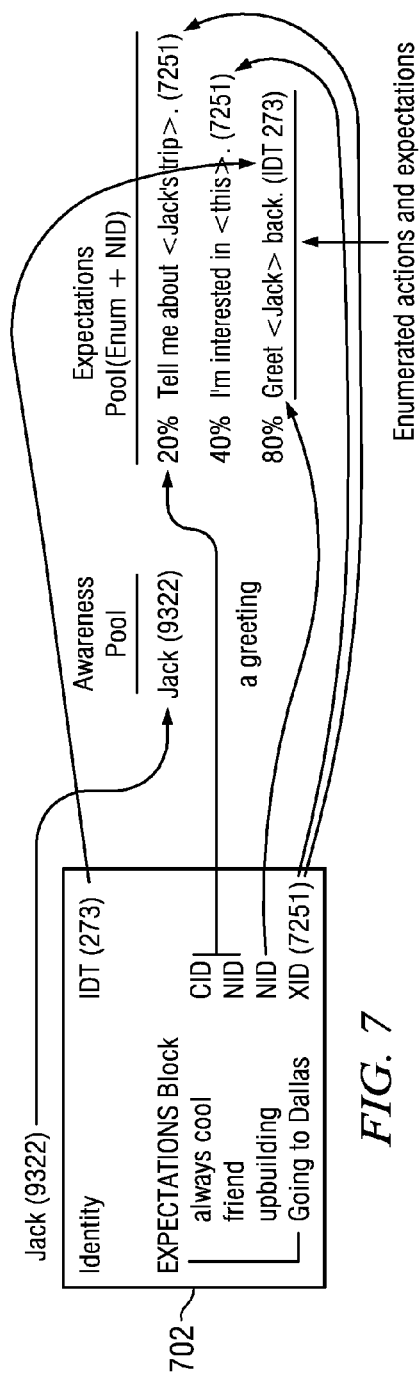
FIG. 7 illustrates a diagram of an expectations block.

Some of the above expectation pool entries would not occur unless (I) had known that Jack was going to Dallas. (I) think he's cool and is up-building to me as a friend. For me (as the brain), this sets certain expectations of Jack, and they come into play when I become aware of Jack's greeting. FIG. 7 shows the Jack neuron and fact that it contains an expectations block presently consisting of 4 relns. From this block is derived the some of the information inserted into the Expectations pool.

The primary content of both the Awareness and Expectations pools are an enumeration that indicates an activity or indicator primitive and some form of a neuron ID, regardless of the type of neuron referenced. One other item in each pool entry is a worth indicator. It can be seen from FIG. 7 that the identity block with an identity neuron code 273 is provided, which is identified as a block 702 provides only a small number of the relationals or relns associated therewith. This is an instance neuron that indicates the instance of a person, wherein the person neuron exists with various relns associated therewith. Therefore, the Jack neuron (having a neuron ID NID) of 9322 would have an identity reln of 273. Further, it would have a reln pointing back to the Person neuron, which would then flow back to other parent neurons and have other associated neurons. The expectation block provides a number of items such as a clump ID (CID) for "always cool" and an NID of "friend." There could also be an NID for "up building." The awareness pool for this dialogue will initially be that there is a instance of Jack at the NID 9322 and the fact that this is the greeting. The expectation pool would have three expectations. The first would be the indication of tell me about <Jack's Trip>, the < . . . > referring back to the expectation block in the Jack neuron, which is set as "going to Dallas," this being an XID (7251). This would have a 20% rating or weight in the expectation pools. The second is the expectation of "I'm interested in <this>", which < . . . > refers to the XID (7251) for going to Dallas. The next expectation would be to "greet <Jack>", wherein the < . . . > would refer back to the identity portion of the Jack neuron indicating that this would be set as "greet Jack back." The weight or ratings are set for that, since this is a greeting and it is associated with Jack, that the "greet <Jack> back" expectation would have the highest rating or weight. The reason that the awareness pool has a "greeting" awareness is that the initial part of the dialogue was "Hi. I am Jack." So, the normal flow of the discussion would be to greet Jack back.

Text Generation

When the Fonx subsystem is invoked to generate an appropriate sentence, it uses the enumeration and neuron IDs as the basis for the process, as well as its recent history of the conversation. It chooses the appropriate words to convey the intended concepts and action. Since the "greet Jack back" has the highest expectation, this will be the path followed.

Selection of Greeting

Figure 8:
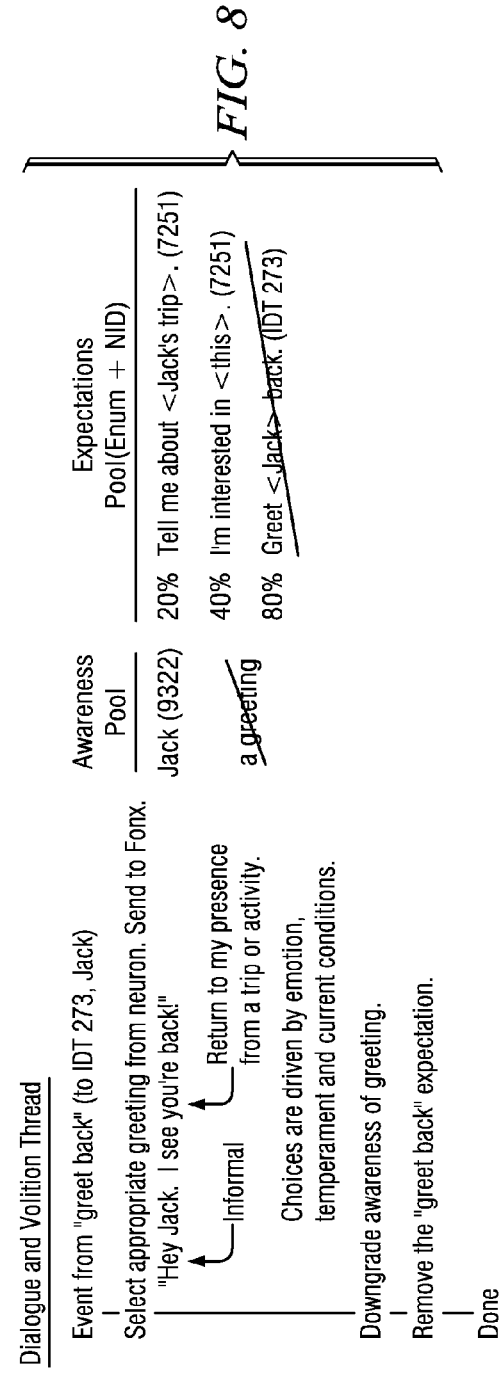
FIG. 8 illustrates a flow diagram for a greet-back response.

The second phase of the above greeting process is to select a method of greeting and the content of the interchange. This is initiated in the volition thread by the "greet-back" event triggered previously (above). This event type selects an appropriate method and text of greeting, based what (this) brain is familiar and comfortable with. Alternative forms of expression are selected from a my-greeting-response neuron. The flow, action and choices for this are depicted in FIG. 8. Since the first step of discussion was to loop through to the "suspend" or wait step and wait for some type of release, the next one would be the greet back event. The greet back would be to a particular IDT, which in this example is IDT 273 for Jack. The appropriate greeting would be selected from a neuron and this greeting sent to the Fonx. The greeting would be "Hey Jack. I see you're back!" Since the Awareness pool has now generating the greeting, the next step is to downgrade the awareness of the greeting in the Awareness pool essentially eliminating that. Further, since Jack has been greeted back, the expectation pool will also be downgraded and remove the option or the expectation of providing a greet back to Jack. This would constitute the dialogue and volition thread, which would pass back to the wait or suspend mode in the overall loop.

Prompt to Initiate Monologue

Figure 9:
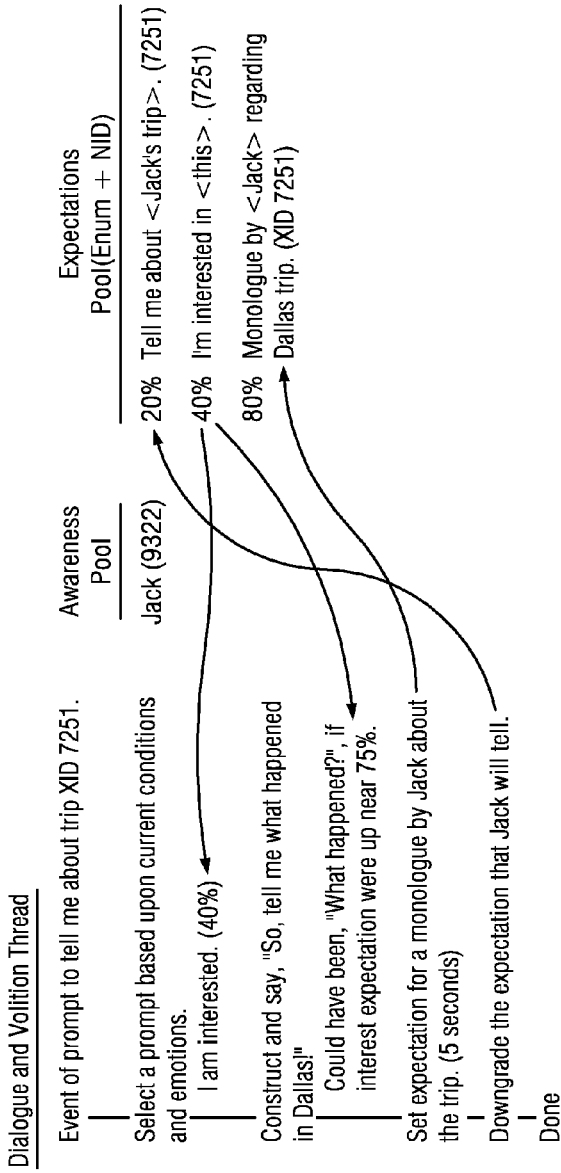
FIG. 9 illustrates a flow diagram for initiating a dialogue.

An event was previously issued to have Jack tell about the trip. When the specified time has elapsed, the event will prompt the volition loop to have Jack explore what happened on the trip. FIG. 9 illustrates this portion of the interchange. In this operation, the various prompt method is dependent upon the present conditions and emotions, which included interest in hearing details of the trip. The expectation pool has an expectation of "tell me about <Jack's trip>," "I am interested in <this>" or another expectation that is a monologue regarding the Dallas trip. The monologue had little or no expectations in the greet back but, after the greeting, the monologue regarding the trip was raised to a higher percentage. Therefore, the first thing that would happen would be to tell the greeter about the trip. The first step would be to select the prompt based on the current emotions and conditions, i.e., I am interested in <this> referring to the going to Dallas trip. The next step would be to utilize the Fonx to construct and say "So, tell me what happened in Dallas!" The type of response is a function of the expectation level in the particular example, the expectation is at around 40%. However, if the expectation were up around 75%, then the response could have been "What happened?", indicating a much higher interest rather than a casual interest indicated by the 40% level of expectations. Thereafter, the expectation for a monologue by Jack would be raised to 80%. Once the expectation for the monologue has been raised, then the expectation for "tell me about <Jack's trip>" would be lowered 2% and then the system would go to the "wait" or suspend mode to wait for the dialogue by Jack. It can be seen, therefore, that the particular sequence of the interaction is based upon the enumerated expectation in the expectations pool with the state of the awareness and expectation pools being updated based on the flow in FIG. 8.

A similar process to this is used for almost any form of dialogue. The process is initiated by external events or conditions, many/most of which were initiated at the same time the Awareness pool entry was made. The enumerations of the Awareness and Expectations pools define the task to be accomplished in the volition loop, and the choices made while carrying them out are affected by current conditions, emotions and temperament.

The Analysis of Dialogue

In general, dialogue will proceed in a logical progression. The following background will be helpful in this aspect. First, the context of dialogue will have the following thread:

Threads of Content

Sympathetic appreciation of context (context list)

Sorted-out main line of argument from the verbiage (argument topic list)

Weighting of strong and weak points of an argument (argument points list)

Evidence behind the claim(s) (Evidence list)

Identification of conclusion (Conclusions list)

Questioning of claims based on expert knowledge (a list)

Items of vagueness and ambiguity (Ambiguity list)

The unstated parts of the argument, for probing (Probe list)

Arguer's position and commitments stated by the evidence (Commitment list)

Argument's thesis (a list)

Assessment of argument: Weak, erroneous, fallacious

If assessment is not strong, evidence needed to justify the positions (a list)

Modes of Argument—Challenge/Response (to "reason together")

Concepts of Architecture

Set of Profiles for Question-Answer dialogue on disputed subjects

He who asserts something must prove it.

In casual conversation, if a premise does not have direct bearing on the issue, perhaps let it slide.

General Remarks on Dialogue

In dialogue, both parties have an obligation to work towards fulfilling their own goals, and to cooperate with the other party's fulfillment of his goals. A "bad argument" is a failure of either party to meet one of these obligations.

In a discussion, dialogue or monologue, the speaker makes assertions or asks questions. Knowledge or assertions may be contained in either type of statement. The assertions made may be accurate or false; the speaker may be trusted or not.

The listener internally accepts or rejects each such assertion, generally on a case-by-case basis. This happens whether the parties are engaged in formal (forensic) debate or a friendly discussion.

Internally, the speaker's brain must track each assertion he has made and each underlying premise he has used, and whether or not each was accepted or rejected by the other party. This acceptance or rejection plays a large role in the flow of the discussion or debate.

Remarks on Context

All dialogue happens within a given context, which one normally accepts with little thought. The context contains information such as "Who the audience is," "Where and when the dialogue takes place," and "What the dialogue is about." This information provides necessary clues about how the dialogue will ensue. It is necessary to refine the context throughout a dialogue, as its elements may change over time. The speakers might move to another location, or another person may join the conversation, and the topic will evolve as the discussion progresses.

Creation of Premises and Propositions

Premises are underlying assumptions that are implicit in any assertion made; it may be implied but not directly stated. Premises exist for both questions and general statements.

On the other hand, propositions are assertions that the speaker makes to the other party, and these are normally an explicit part of a question or statement. Like the underlying premises, propositions (which may be about—or be—the premises) are either accepted or rejected by the listener.

For example, the listener is asked a question on an issue. If he gives a "direct" answer (rather than objecting to the content or format of the question, he is assumed to have accepted both the premises and propositions involved. (The responder may have misunderstood the question and directly answered on the basis of what he understood. To correct this, the question and its propositions will likely have to be closed out (answered) and the adjustment made at a higher level, perhaps through asking an alternative question.) He may reject either by objecting to some element of the question rather than by giving a direct answer. Accepting the proposition or premise is called a commitment.

Figure 10:
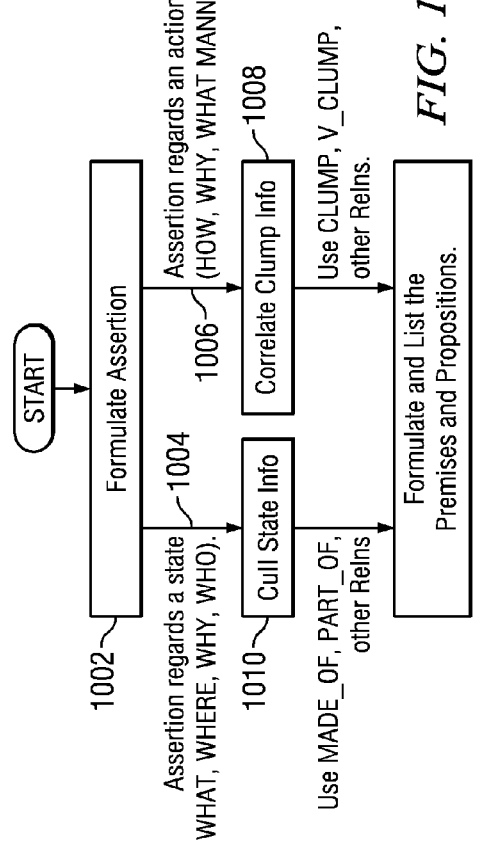
FIG. 10 illustrates a flow diagram for formatting an assertion.

FIG. 10 shows a flow diagram for formatting positions in a dialogue where the information contained in the premises and propositions (assertions) comes from. The process may be iterative and usually starts from the topic item or a sub-topic that emerges during the process.

The dialogue or monologue may be in response to a question or observation on a topic, or may be for purposes of educating the other person (often called respondent, here). It may also derive from personal need, i.e., by the needs-based areas of the brain.

Generalized Flow of Discussion

Before the premises are examined, the context must be formed (or refined if the premise is embedded).

Form or refine dialogue context
Form or refine strategy
Anticipate or refine rules Once these steps are accomplished, proceed to examine the premise or proposition.

A general flow to set up the premises and proposition is:
Accept or otherwise determine the topic or sub-topic.
Discover whether the premise is allowed (check rules and topic).
Accept a relevant condition or action relating to the topic (Block 1002). This will branch to either a state branch 1004 to determine WHAT, WHERE, WHY, WHO, etc. or an Action branch 1006 to determine HOW, WHY, WHAT MANNER, etc.

For actions that proceed along the Action branch 1006, an assertion or question may be something like "How will we accomplish the task?" For this type of assertion, lookup is usually based on clumps/neurons (block 1008).

For state that proceeds along the State branch 1004, a assertion or question may be something like "Where is he living?" For this type of assertion, lookup is usually based on neurons and associated relns. There will e neurons for "he" and "living" and an association can be made between the specific instance for "he" and the reln for "living" that will be associated with the instance neuron.

Cull the above sources for information in block 1010.
Form the premise or proposition list(s) in block 1012 from both branches 1004 and 1006.

Both the premises and propositions are formed as linked lists, and each has a status flag that defines whether or not the respondent has accepted it.

Assessment of Feedback Information

Much of the flow of discussion (whether dialogue or monologue) is controlled by feedback. The speaker's brain must assess the following types of information about the discussion.

Assess the Speaker's Dialogue Data
  Topic or Interest
  Goal or Purpose
  Premises and commitments made
  Propositions and commitments made
  Question types (who, what, what manner, why, how . . . )
Assess the Respondent's Dialogue Data
  Topic or Interest
  Goal or Purpose
  Premises and commitments
  Propositions and commitments
  Question types (who, what, what manner, why, how . . . )
Assess Respondent Positions, developing and tracking a Worth for each
  Intention (debate, quest for knowledge, teaching, picking a bone, attack . . . )
  Assess Topic Repetition that may indicate strong feelings about the topic, or may indicate argument or picking a bone.
    Of Question Type (WH or Y/N Types ( )
    Of Assertions
    Of Topic Items
  Negativity or Derogatory Terms that may indicate strong feelings, picking a bone, or personal attack.
  Other Contention Indicators that may redirect the flow of discussion, change of topic or method of debate/discussion
  Change of topic because of decreased worth in former topic indicators There are many indicators that arise during the course of discussion that must be identified and recorded as they occur. At that same time, it must be assessed whether the flow of discussion should be altered because of new indicators.

Generalized Discussion States

FIG. 11 illustrates the general flow of discussion states, wherein person A is talking to person B. They are involved in two-way dialogue when interrupted by a third person C. The interruption may be ignored or responded to. The bubble 1102 indicates the conversation wherein the dialogue thread is in the form of posing some type of discussion associated with a discourse by person A. This is referred to as talking to person B. The state is that at a question will be posed to B, as indicated by a state change 1104. When this question is posed, then the loop will pause. This is where the discourse changes over to person B and person A, as indicated by bubble 1106, will be listening to person B, which indicates the state where an answer is given, at a state change 1108. During the listening, person A will have some interest level, which, in this example, will be "politeness" in the answer. This is indicated by a state 1110. When the answer is given, the state changes back over to the discourse wherein person A is talking to person B. When creating the question to person B, the state of person A can be in a loop state, as indicated by a looping state 1112, which indicates that any interruption will be rejected. This indicates the type of discourse, which is, in this in example, a "teaching" discourse. However, there can be a state where person A, even though talking to person B, i.e., entering into a discourse to generate a question for person B, can be listening to person C. This is indicated by state change 1114. There is not necessarily any discourse with person C but, rather, merely the ability to receive an answer from person B and have an interest in person B at a certain, i.e., "politeness" or and also listen to person C.

Forming Context

Discussion Drivers

Discussion can be initiated for diverse reasons, which may partially determine the type of dialogue method(s) used during the discussion. Some of these reasons include:

Human Needs (There are essentially nine basic needs)
Responding to a Third-Party Request for Information
Responding to a Question by Another Person
Curiosity About a Topic
Teaching or Training Someone Else
Events that occur Each of these drivers influences context. They might form a bias (e.g., toward a particular need) or they might set the dialogue type as Educational, etc. Note that truly interactive conversation requires both parties to share an overall context of the discussion they are having. A dialogue in which the parties are just taking turns soliloquizing is a poor dialogue. To properly label a verbal interaction a "dialogue," we must have a mutual interactivity, give and take, stimulus and response. There must be some shared common thread to the dialogue—a persistent topic, or them, or mood, style, flow, etc. . . . or perhaps all of these at once if the conversation is a good one.

Who is the audience?

Information about the audience (whoever is on the receiving end of a premise) affects the context of dialogue. If I have a quarrel with an acquaintance or a neighbor, I will handle it differently than if I had a quarrel with the President (assuming I could get an appointment to speak with him). However, if I am the President's mother, it does not matter who he is, he is still my son and I will speak with him how I wish.

What is the topic?

Controversial topics demand delicate handling. When discussing whether abortion should be legal, the involved parties should be aware that talks about this controversial issue could escalate into a quarrel if it is not handled correctly. Also, if at least two parties do not agree on the topic, the discussion Where and when does the dialogue happen?

The speaker must be aware of the time and place, to know what types of speech are acceptable. A courtroom has formal rules of procedure. During a trial, all parties are expected to follow those rules, and failure to do so can result in expulsion from the room. However, after the trial is finished, the rules of procedure are different. If the lawyers are friends (and have remained so through the trial) they can joke around and use familiar language they could not have used in the trial.

How does the dialogue proceed?

The rules of the dialogue can be predicted by answering the preceding questions. The types of dialogue I might have with the President are severely limited, especially if the where and when are at a press conference after a terrorist attack on the US. Should I try to have a discussion about the implications of outlawing sugar in public school cafeterias, I would likely be asked to leave.

The information listed above forms the context of a dialogue. These data are then used to anticipate the dialogue type and form the rules of discussion. The following sections discuss dialogue stages and types, as well as the dialogue rules (locution, commitment, etc.).

Dialogue Stages and Types

Stages of Dialogue

Opening
  Choose dialogue type.
  Define arguments.
  Define presuppositions.
Confrontation
  Define and elicit agreement on the issues to discuss.
Argumentation
  Engage in iterative debate.
  Exit when commitments have been satisfied and all implied needs have been met.
  Move to closing when indicators such as, "In conclusion" are encountered.
Closing For argumentation stage, expect and analyze the answer. Upon hearing a question, perform type and meaning analysis.

The basic types of dialog are each driven by a different purpose. Each has its own characteristic, purpose, flow profiles, methods and requirements.

| Dialogue Type | Initial Situation | Method | Goal |
| --- | --- | --- | --- |
| Personal Quarrel | Emotional disquiet | Personal attack | Hit out at the other. |
| Debate (Forensic) | Forensic contest | Verbal victory | Impress audience. |
| Persuasion | Difference of opinion | Internal & external proof | Persuade the other. |
| Inquiry | Lack of proof | Knowledge-based | Establish proof. |
| Negotiation | Difference of interest | Bargaining | Personal gain. |
| Information-Seeking | Lack of information | Questioning | Find information. |
| Action-Seeking | Desire for Action | Issue imperatives | Produce action. |
| Education (of others) | Ignorance | Teaching | Impart knowledge. |
| Entertainment | Boredom | Humor, wit, surprise | Entertainment |

Personal Quarrel

The quarrel represents the lowest level of argument. It contains:

Aggressive personal attack
Heightened appeal to emotion
A desire to win the argument at all costs The quarrel is characterized by:

Loss of balanced perspective—outrageous arguments
Fallacious ad hominem attack (attack against the person rather than the argument)
The bad or heated argument
Use of fallacies, vicious attacks, one-sided criticisms Goals of the quarrel are:

Attack or hit the opponent at all costs, using any means, whether reasonable, fair or not The personal quarrel should be avoided at all costs, but recognized for what it is. When on the receiving end of a quarrel, the following steps should be taken:

Discover the issue
Evaluate my guilt or innocence
If guilty, admit it and apologize
If innocent, apologize without accepting responsibility.
Escape the argument The most important part of the above process is the escape. If attempts to discover the issue or apologize fail, the next step is to get away from the attacker rather than argue.

Attack (Personal)

Should one have reason to be on the aggressor side of a quarrel, he should proceed in the following manner:

Find offender
Attack in whichever way is most effective
Demand an apology or retribution
Evaluate offender's response
Exit attack The attack has no limits, unless the attack is strategic, as in a debate. In that case, the attack can be limited to be "effective" yet still within reasonable boundaries.

Debate (Forensic Debate)

The forensic debate is done for the sake of third parties, who are the judges of its merit and its winner. It is regulated by rules of procedure (which can be kept in a "permissibles" list). A debate may contain the same emotion as a quarrel, but the reasoning behind the arguments is more thought out. Debaters are competing for points, are subtracted and added throughout the debate, and the ultimate goal of a debate is to win, whether or not the winning argument is "true." The debate follows a formal structure depending on the style of debate.

The following process is to be followed for a debate style of dialogue:

Evaluate debate type and rules
Evaluate the issue
Prepare argument
Anticipate counterarguments
Debate according to format
Close debate and evaluate score The debate format and rules will vary according to the debate type (Worlds/Europeans, US, Lincoln-Douglas, etc.), but are easily modified once the type is determined.

An example of two "conversation modes" one can get into are:

Pure expression (intellectual or personal, where you are simply expression yourself, but not necessarily trying to engineer any particular response from the listener, e.g., stating, declaring, defining, identifying, etc.

Response-elicitation (where you are trying to lead the other converser into providing a specific response, e.g., questioning, suggesting, implying, leading, etc.)

Persuasion Dialogue (Critical Discussion)

Goal of each participant is to prove his conclusion from premises that are accepted by the other participant. Successful persuasion is exhibited by change of behavior in the other participant. An argument that begs the question is automatically doomed in this form of discussion. Arguments here are based on weak premises and may have low expectations. A persuasion dialogue proceeds as follows:

Determine persuasion topic (the desired change of behavior)
Appeal through persuasive methods (needs, common ground, tricks, etc.)
Evaluate success
Build on persuasion, attempt new method, or exit dialogue Involved in Persuasion Dialogue is determining the other participant's needs, attitudes, areas of common ground, and more. Identifying these things allows the persuasion to be specific to each person and thereby more effective. Also worth noting is which types of tricks (yes-yes, ask which, planting . . . ) work best—if at all—on a particular person, so that these can be added or deleted from future persuasive dialogues with that person.

Inquiry Dialogue

Begin with a set of known premises and work with them to discover what is true. This is the Sherlock Holmes method, where one examines the facts, discovers new facts, and finds a deduction that must be true, assuming all the premises are true. Conduct an inquiry in the following manner:

Determine what is already known
Determine what needs to be known
Ask a question to acquire more information
Add answer to list of knowns and ask, "What does this mean?"
Evaluate whether enough knowns exist to form a deduction
Continue inquiry or explain deduction Using this method, one acquires the necessary information to draw a deduction—which must be true if all the premises are true—and thereby exclaim, "Elementary, Watson!"

Negotiation Dialogue

The goal is to reach a mutually beneficial agreement through whatever means necessary. Seek a threshold crossing of satisfaction. Provide for multiple issues and be prepared to concede something now if it offers a greater benefit later. A negotiation will proceed as follows:

Determine role (buyer or seller)
Decide on own interests and rank them
Determine a satisfaction threshold—the "must haves"
Assess the other's priorities
Initiate (or be initiated into) negotiation
Negotiate unto satisfaction
Exit negotiation This process of negotiation allows all parties involved to reach a mutually satisfying agreement.

Information-Seeking Dialogue

If the inspiration is curiosity, the information sought has a level of satisfaction that says, "That makes sense to me. My curiosity is satisfied." However, if the information is needed, the level of satisfaction is based on whether the inquirer has obtained the necessary information. This dialogue type is similar to an inquiry, except with different drivers and different goals. It proceeds in the same manner as an inquiry, with a set of premises, missing information, and questions about the missing information until the curiosity is satisfied.

Action-Seeking Dialogue
Seek commitment to specific action.
Give background.
Issue imperative or question.
Set expectations for answer.
Evaluate answer for yes/no result.
Exit An example of the above process is, "You look tired. Have a seat." Expect "him" to sit, and see if he did.

Educational Dialogue

One-sided focus, educating me or (him). Determine a "need-to-know" requirement to be met by the educator. This requirement brings focus to the dialogue, as well as a test for relevance (especially when the educator is asked a question). One type has the educator in a monologue with questions throughout, another has the educator asking questions of the students and evaluating their responses for veracity, elaborating on them when necessary. The first type has this flow:

Explain the rules ("If you have a question, interrupt me")
Introduce the subject
Teach, allowing questions per the rules
Close teaching
Take questions and respond
Receive and evaluate feedback This is the basic structure of an education dialogue, and only the common type. The other type has the educator allowing the students to speak, while the teacher acts as a guide and source of information for the discussion.

Dispute

One party affirms a given proposition while the other party affirms the opposite of the same proposition. The dialogue centers around each party offering premises that support their own claims or refute the claims of their opponent. This dialogue has a simple structure which is as follows:

Determine issue
Evaluate opinion
Take sides
Listen, evaluate claim, respond
Repeat unto satisfaction A dispute does not necessitate bad feelings or heated arguments. The point is that there is one issue and two opposing opinions. Through the discussion of opinions and facts, someone might change their mind, however it is unlikely. The "satisfaction" is thus not a change of behavior, but rather some point that says, "I have discussed this enough."

Dialogue Management

One of the keys to dialogue management is the degree of initiative taken by each party. Each dialogue participant can either proactively steer the conversation in some direction, or simply react to the other participant. So in an actively managed dialogue, the system would bring the conversation back on topic if we started to stray, and in an unmanaged dialogue, it would only affect the conversation one sentence at a time, always waiting for a signal to respond.

"What to say next' depends on what mode is appropriate to the conversation. Sometimes, you speak to be heard, and are open to whatever response you might receive (just 'putting it out there' or 'fishing for a response' or "bouncing and idea" off someone). Other times, you speak specifically to affect a response. This targeted speech is about eliciting some expected feedback, so you know you've led the listener to a specific state of awareness about you and your perspective. If you can get them there, then you have shared context and understanding, and the dialogue can proceed correctly (as opposed to continued miscommunication). This parallels the idea that it takes both a transmitted message and a feedback response to create a complete "communication loop".

Sometimes . . . we converse simply to see where the conversation takes us, sort of like "babbling toward meaning." The theme and direction of the conversation is not always known beforehand; it is often created/discovered during the course of the conversation. Sometimes, it takes a few exchanges of sentences before one can ask, "where is this conversation going?"

One of the keys to good conversation is the ability to occasionally 'break out' of the conversation and realize (implicitly or explicitly) what the conversation is about. When a speaker can step outside of the dialogue and make some statement about the dialogue, itself, then he/she is demonstrating the ability to truly step back and generalize on-the-fly. And this helps maintain common context, too. An example conversation with the emulated brain would be:

Nate: I am bored.
Me: Intelligence is over-rated. Not all intelligence is good.
Nate: Intelligence is necessary for understanding.
Me: Intelligence need only be actionable to be of use. Understanding is not necessary, nor is it always a goal. Some intelligence is useful for us to act on, some intelligence is unreliable, and some is simply fabricated or artificial.
Nate: Wait, are we talking about intellectual intelligence or military intelligence?

The ability to ask the right question at the right time in order to reduce a growing conversational ambiguity is a key to maintaining shared direction and focus to the dialogue. Ambiguity recognition should trigger a clarification request.

Rules of Dialogue

Generally, any detected rules-violation should trigger an event of some form, or must take part in a centralized condition-handling mechanism.

To model dialogue types, as discussed in Walton and Krabbe (1995) (see Chapter 2, Section 2.7.2), the authors used seven dialogue moves: assert, accept, question, challenge, request, promise and refuse. For each move, they defined rationality rules, dialogue rules, and update rules. The rationality rules specify the preconditions for playing the move. The update rules specify how commitment stores are modified by the move. The dialogue rules specify the moves the other player can make next, and so specify the protocol under which the dialogue takes place.

The above might be organized something like:
assert(p) where p is a propositional formula.
Rationality—the player uses its argumentation system to check if there is an acceptable
argument for the fact p.
Dialogue—the other player can respond with:
1: accept(p)
2: assert($\neg$ p)
3: challenge(p)
Update $CSi(P)=CSi-1(P)\cup\{p\}$ and $CSi(C)=CSi-1(C)$
challenge(p) where p is a propositional formula.
Rationality ø
Dialogue the other player can only assert (S) where S is an argument supporting p.
Update $CSi(P)=CSi-1(P)$ and $CSi(C)=CSi-1(C)$ Where the above bolded items represent enumerations or tokens representing a sequence of dialog "Schemes" (possibly 'argumentation schemes'), per Walton, et. al.

Other works have proposed a protocol but with fewer locutions called dialogue moves. The legal dialogue moves are request, promise, accept, refuse, challenge and justify. The content of the dialogue moves request and promise are resources, while the content of the other four dialogue moves are themselves dialogue moves. For example, accept(Move)

is used to accept a previous dialogue move Move and challenge(Move) is used to ask a justification for a previous dialogue move Move.

Locution Rules—Kind of speech acts or locutions that are allowed.

Dialogue Rules—Turns-taking and other guidelines

Commitment Rules—Specifies how each type of locution leads to commitments by the participants.

Strategic (Win-Loss) Rules—Determine the sequence of locutions that constitute fulfillment of goals.

Rules of Relevance—(Specific types) Participant may not wander too far off the topic (goal) of the dialogue.

Rules of Competitiveness—(Specific types) Participant must answer questions cooperatively and accept commitments that reflect his position accurately.

Rules of Informativeness—(Specific types) Participant must provide enough information to convince his respondent but not provide more information than is required or useful for the purpose.

Question-Answer Rules—

A direct answer to yes-no question is 'yes' or 'no'.

If you give a direct answer, you become committed to the question's propositions.

A direct answer to a why-question is to produce a set of propositions that implies the proposition queried.

A direct answer to a whether-question is to produce a proposition that represents one of the alternatives posed by the question.

A person may retract or remove his commitment to a proposition explicitly. He may not give a "no reply" to a question about his own commitments.

Options for reply to an Objectionable Question.
    Answer "No commitment" (or equivalent).
    Reject the presuppositions rather than answer the question.
    Attack the question itself.
    If question is aggressive, responder must be aggressive too.

Rules for "Objectionable"

A question is objectionable if it attempts to preempt the responder on an unwelcome proposition, by presupposing that the answerer already accepts it.

Question is overly aggressive.

Unwelcome propositions are those the responder is not committed to, those that are prejudicial to his side of the argument.

Negative Rules (for Persuasion Dialogue)—

Opening Stage
    Shift in Type of Dialogue—

Confrontation Stage
    Unlicensed attempt to change the agenda
    Shift to argument stage without agreement of agenda Argumentation Stage
    Not making effort to fulfillment obligation
    Not meeting burden of proof
    Not defending a Challenged Commitment
    Shift your burden of proof to other party, or alter burden of proof
    Carry out internal proof using premises not yet conceded by other party
    Appeal to external sources of proof w/o backing up arg properly
    Failures of relevance
        Providing wrong thesis
        Wander away from point to be proved
        Answering the wrong question
    Improperly dealing with questions
        Failing to ask question appropriate for stage of dialogue
        Asking questions that are inappropriate
        Failing to reply to question properly, including answering evasively
        Failing to define, clarify or justify meaning or definition of significant term
            Also, failing to use standards of precision appropriate to the discussion, if challenged by another participant Closing Stage
    Attempt at premature closure, unless by agreement or by fulfillment of the goal These failures to perform normally are not behavioral requirements for the emulated brain. They are behaviors to be observed in other's conversation. However, for realistic emulation of New Yorkers, it may be a reasonable goal to build evasiveness and irrationality into the dialogue. For each "rule-breaking," the emulated brain can decide if the offense was enough to quit conversation or if it should continue. It will also check to see if the offense is common to that particular person, so that it becomes a personality trait.

Major Informal Fallacies (Attack Strategies)

Types of Fallacies

Informal Question Fallacy

Fallacy of Many Questions (or, Fallacy of Complex Question)—Loaded, "Have you stopped beating your wife?"

Ignoring the Issue Fallacy

Appeal to Force Fallacy

Appeal to Emotions Fallacy—, emotions, enthusiasms, popular/group feelings

Personal Attack Fallacy—ad hominem—(responding to)

Argument from Ignorance fallacy (ad ignorantiam)—P22, P43, P44; Just because something has never been proven does not make it is false. Conversely, never proven false does not imply true.

Fallacy of Equivocation (Confusion between two meanings of a term w/contextual shift)

Straw Man Fallacy (arguer's view is misrepresented, exaggerated or distorted)

Fallacy of Arguing in a Circle (circular proof)

Slippery Slope Fallacy (presuming a sequence of inevitable events)

Fallacy of Composition (attributing properties of parts as properties of the whole)

Black-and-White Fallacy (question poses exclusive disjunction that misrepresents the possibilities allowed in a direct answer)—("Is a zebra black, or white?")

Analyses for Fallacies and Criticisms

Do both sides agree on the thesis (conclusion) being discussed? This must be established before irrelevance can be evaluated or charged, i.e., are both sides grousing about the same proposition?

Is the (agreed) thesis about one proposition—on the surface—but really about another issue? E.g., arguing about who should take the trash out this morning, but the real issue is why the other person came come late last night without an explanation.

Does the conclusion agree with the premise (proposition or thesis)? If not, this is an ignoratio elenchi fallacy.

An ignoratio elenchi (ignoring the issue, or irrelevant conclusion) exist when an argument fails to prove the conclusion (thesis) it was supposed to prove, but is instead directed towards proving some other (irrelevant) conclusion.

If an ignoratio elenchi is considered but the proponent has not finished his argument, the charge may be premature. He may move to conclusion-premise agreement before he is done. Instead, treat the criticism as a request for more information.

An argument that appears to refute the thesis of the other (but really does not) may be determined to be a case of ignoratio elenchi.

A sentence is fallacious if it forces him to accept a proposition that he should not.

Methods, Tactics and Argumentation Schemes

Weigh strong and weak points of an argument (argument points list), then attack the weakest point. Of particular interest are claims based on expert knowledge, as well as ambiguous items and information that is left out (omission could indicate downplay of a weakness)

Dig at the evidence behind a claim. If the evidence is good but it would be disadvantageous to agree to it, try using a fallacy if the dialogue type allows it Use fallacies to throw the opponent off balance Shift Burden of Proof, usually answering a question with a question Show that argument is open to reasonable doubt Show that opponent's explanation may not be the only one Show that argument lacks support and is open to questioning Show that the arguer is not believable Show that arguer's logic is faulty (premises conflict, or assumed cause-effect)

Preempt expected answer to question (Process rule)

Aggressive or Loaded Questions: Reply to question with a question. Have the questioner prove his presuppositions to the question, giving evidence for the assumptions made. Victim of unsupported accusation must not try to prove his innocence Question the presuppositions of the question Criticize respondent for evasiveness (irrelevance)

Suggested Courses of Action When Answering Questions

For ad ignorantam Cases: If experts have tried to prove it and failed, concentrate on trying to prove it false, rather than true.

For Loaded Questions: Reply to question with a question. Have the questioner prove his presuppositions to the question, giving evidence for the assumptions made. Victim of unsupported accusation must not try to prove his innocence.

No Answer: If the question repeats previous question.

No Answer: If question is unduly aggressive or argumentative.

No Answer: If question lacks clarity, is misleading, or is ambiguous.

No Answer: If question is addressed to an expert and is outside his field of expertise. A non-answer to these last 4 cases removes the obligation to answer the questioner.

General Case: Reply to the question with a question to shift the burden of proof back to the questioner. (The questioner may then declare the returned question to be evasive.)

For a 'complex question' (it contains and, or or if-then), the responder must question the question by separating the propositions in the presuppositions into units he can reasonably deal with.

A question that is 'objectionable' is open to reasonable criticism or objection by the responder. This is especially so when the question is objectionable because it is overly aggressive.

If questioned to prove, clarify or defend a proposition he has already committee to (even by default), responder must directly respond. "He who asserts must prove."

Suggested Courses of Action When Asking Questions (Technique)

Aggressive Questioning: Pack so much loaded information as possible into presuppositions of a loaded question that the respondent would be severely implicated in any attempt to a straight answer. If packed into a loaded yes-no question, and the respondent fails to give a straight yes-no answer, then him of evasion or of failing to answer the question.

Conclusion Analysis

Use of definitely or conclusively in an ad ignorantiam argument suggests the argument could be fallacious.

If conclusion is phrased as plausible presumption, an ad ignorantiam argument may be reasonable.

Look for conclusion indicators such as therefore, thus, and consequently.

Burden-Of-Proof Analysis

Evaluate the burden of proof for every proposition by either side.

Presuppositions of Questions and their Analysis

Questions have presuppositions and can advance a set of propositions. A question calls for an answer, but when the respondent gives the direct reply that was requested, he automatically becomes committed to those propositions. Questions therefore influence the outcome of an argument most decisively.

A presupposition of a question is defined as a proposition that one becomes committed to by giving a direct answer to the question.

Complex Questions have two or more presuppositions.

Yes-No Questions: The main presupposition that the yes-answer is true or that the no-answer is true. E.g., in "Is snow white?" snow is either white or is not white.

Why-Question: The main presupposition is that the proposition queried is true. E.g., in "Why is chlorine heavier than air?" the proposition is that "Chlorine is heavier than air."

Whether-Questions: The main presupposition is that at least one of the alternatives is true.

Did-You Questions: The main presuppositions include the existence of the purported action and the existence of the related facts. E.g., in "Have you stopped beating your wife?" the presuppositions are that you did beat your wife, and that you indeed have a wife (i.e., an R_POSSN or possession reln).

Do-You Questions: The main presupposition is that the purported action or condition is true.

Presuppositions of Questions

A proposition presumed to be acceptable to the respondent

Respondent is committed to the proposition if he gives a direct answer.

Unwelcome Commitments—Trapped by fallacy of Many Questions.

Loaded Questions—Fallacy of Many Questions.

Harmful (or not)

Critique of Questions:

Reasonable: The question is clear of fallacies and can be answered directly.

Fallacious: The proposition within the fallacy must be dealt with before the question can be answered.

Complexity: Each proposition must be dealt with in turn, rather than answering the question as a whole.

Objectionable: When it becomes too aggressive. (Possible global event.) Answering an overly aggressive question causes responder to be discredited and undone. Violates reasonable order of Q & A in dialogue. Question is especially objectionable if question is overly aggressive.

Circular: ("begging the question") A has a B; B is a C; Therefore, A is a B.

Analysis of Propositions of Dialogue

The normal expectation is for a helpful answer. However, the answer must be analyzed to determine whether it is actually helpful.

Types of Answers:

Direct Answer: In addition to answering the question, the responder has also agreed to the presuppositions of the question.

Indirect Answer: The responder can be accused of being evasive or committing a fallacy of irrelevance. (In political debate, it can look guilty.)

A Reply: This is answering a question or a premise with a premise of one's own. This is especially acceptable in answering a loaded or complex question, in which one must address multiple premises or presuppositions.

Answering With a Question: Shifts burden of proof back to the opponent. This is not always valid, so check to be sure it is before responding.

Critique of Answers

Reasonable:

Judged as Evasive:

Judged as Irrelevant:

Variables

Information is tracked for each argument or question that is part of dialogue. These are kept in a chain of records that are extended as the discussion continues. Older and non-relevant links are discarded when they are outdated, no longer apply, or when overall topic has changed.

For a given dialogue, the argumentation scheme should not change. When it is sensed that the responder has made an attempt to change the scheme, his arguments may be invalidated.

Following is a list of the elements of a dialogue record. Each record relates to one point being made or proven, but each may contain multiple premises or propositions which themselves are independent NIDs (concepts) or CIDs (sentence clauses):

Thesis (or issue)—Proposition to be proved or question of controversy under discussion. This can also be a simple topic (NID) or statement (CID). Both sides have to agree this is the issue under discussion.

Dialogue Method—The method being used for the discussion, though it may change from premise to premise. Keep track of the overall dialogue method, as well as the method for each premise to track shifts in pattern.

List of Presupposition(s) of Argument or Question. These are components of the question or assertions made in support of the argument.

Elemental Statement of Proposition

Level of Commitment by Both Sides (−100% . . . 0 . . . +100%)—Affirm to be false or true.

Level of Argument Support for this Proposition (0 . . . 100%)

Level of objection to this Proposition (0 . . . 100%)

Premise—Beyond the presupposition, this is presumed to be the actual argument. Once the presuppositions are dealt with, consider the argument as the thesis.

Attributes of this Thesis—If something is aggressive, objectionable, or controversial, these are contention indicators.

Assessment of argument: Weak, erroneous, fallacious, strong, fact

Aggressive

Relevant

Objectionable

Adversarial (Personal Attack)

Controversial

Scientific Inquiry (requirement for scientific proof methods)

Credibility Level of Responder or Expert (e.g., not a liar)

Academic

Embedded

Hypothetical

Leading

Rhetorical Argumentation Scheme

Acceptability of a Question (analysis of the question or argument ( )

Reasonableness of a Question

Reasonableness of a Question Length

Complexity of Question

Objection to the Question or Argument as a composite

Argument State—was it resolved? Yes or no.

Argumentation Style and Related Question Sets

Fielding of Questions

Purposes for a Question

Questions may be of the variety expecting a yes/no response, or are seeking some type of information.

The Yes/No Questions

These generally begin with a verb (to be, have, do or a modal verb) and require a single word or a very brief response. Example: "Are you coming tomorrow?" A direct answer (yes or no) indicates a commitment to the question's premises and propositions.

These questions start with any of the following: do, can, has, did, is, was

They also have a subject and a main verb. Examples:

Do you want dinner?

An you drive to the store?

Has she finished her work?

Did they drive home?

Is Romney presidential material?

Was Jim at home?

In each case, the expected (direct) answer is yes or no, but may be followed by a confirmation.

The WH Questions

The WH questions begin with an interrogative word (what, were, why, when, how). They can be viewed to be information questions, because they ask the responder to provide particulars.

The purpose for questions of the WH type are as follows:

Data-Recall Question—Requires the respondent to remember facts. For example, "What are the four rules about numbers?" The expected answer does include anything about how to use the information.

Naming Question—Asks the respondent simply to name an event, process, phenomenon etc. Example, "What do we call the set of bones which cover the lungs?" The expected answer is brief and should not show insight into how the event is linked to other factors.

Observation Question—Asks respondents to describe what they see. Example, "What happened when we added salt to boiling water?" The expected answer does not attempt to explain it.

Control Question—Involves the use of questions to modify respondent's behavior rather than their knowledge. Example, "Will you sit down, Sam?"

The Pseudo-Question—The question is constructed to appear that the speaker will accept more than one response, but in fact he has clearly made up his mind that this is not so. Example, "Do you feel involving in violence was a good thing, then?" The expected answer may be lengthy general information.

Speculative or Hypothesis-Generating Question—Asks respondents to speculate about the outcome of a hypothetical situation. "Imagine that global warming actually exists. What could be the cause of it?" The expected answer may be lengthy information.

Reason or Analysis Question—Ask respondents to give reason(s) why certain things do or do not happen. Example, "What motivates some young people to get involved in drug abuse?" The expected answer may be lengthy information.

Evaluation Question—Is one that makes a respondent weigh out the pros and cons of a situation or argument. Example, "How much evidence is there for the existence of an after-life?" The expected answer may be either a list or a lengthy discussion.

Problem-Solving Question—Asks respondents to construct ways of finding out answers to questions. Example, "Suppose we wanted to discover what prompts birds to migrate. How could we go about it?" The expected answer may be lengthy information.

The analysis of the above alternatives can often be based upon the structure of the question, but may require additional information, such as present context and mood of the discussion.

Alternative Styles of Questions

Indirect Question—May be given as an imperative, or imply a question. It may also be couched in a modal. Examples:
"I wonder where he is."
"Would you please tell me how to fly to the moon?"

The Tag Question—Makes a statement and asks for confirmation. Examples:
"You crave dog food, don't you?"
"Chicago is located in Paraguay, isn't it?'

Obtaining Closure in Dialogue

After arguing about a premise or proposition, there comes a point where those involved must agree or disagree (or decide to move to a new subject). After this point, the premise that was discussed is no longer a viable topic of discussion, unless a later premise calls it into question.

Changes to Premise List

Obtaining closure on an issue causes changes to the premise list. A new premise cannot be accepted if it conflicts with a previously accepted premise (unless the previously accepted premise is explicitly renounced). If this premise is the only one discussed, then once it reaches closure the dialogue is over. Otherwise, the dialogue continues until all premises are resolved, or at least all parties have agreed to disagree.

Making Small Talk

"Small talk" is the mechanism of an introductory process. Small talk humanizes the relationship. As an icebreaker, small talk is a process on the way to engaging in "real" communications. It is significant in that it is the means to connect on a relational heart level with the other person.

With small talk, a person has a basis for self confidence in social situations. Without it there is the (probability) of being socially insecure. It enables one to:
Solve a problem (fill a need)
Set the tone for more serious discussion
Connect with other people
Develop good positive feelings This chapter defines some of the methods and techniques of small talk, and gives them in such a manner that they can be implemented as learned neurons. This is in contrast to implementing them as a hard-coded process.

Small Talk Processes

Some of the small talk conversational processes include:
Engage any individual in meaningful dialogue
Resuscitate a dying conversation
Transition into new topics
Feel more at ease in networking events, parties and receptions
Develop business relationships
Step out of a conversation with grace
To do the above takes the following:
Ignore fear of rejection
Take a risk
Assume the burden of conversation
Guiding Rules of the Small Talk Processes
Some of the rules of small talk processes include:
In safe situations, make it a point to talk to strangers
Introduce yourself
Silence is impolite
Take the initiative
It's up to you to start a conversation
It's up to you to drive the conversation
These are presented here with a mechanism for implementation; that is covered by the remaining sections.

Icebreakers

This section includes example situation-dependent icebreakers. They are suitable for storing as templates in a sequence block of a relevant neuron. A general sequence of conversation (possibly hard for a brain that doesn't have a head to wag) is:
Smile (proactively), or return a smile.
Make eye contact.
Initiate an icebreaker using the object's name, if known.
Smalltalk can later be redirected to more formal dialogue where appropriate.

Business Icebreakers

Each of these has one or more ASOCs (association relns) that can be associated with it. To correctly select from the list of these, it is necessary to match the ASOCs with the current internal conditions. I.e., if there is a need that is begging to be solved and this person may be able to help out, define and use an ASOC to the need neuron. Some of the initial business ice-breakers include:
Describe a typical day on the job.
How did you come up with this idea?
What got you started in this <industry, area of practice>?
What got you interested in <marketing, research, teaching, other_vocation>?

A substantial set of these is included in a text file as part of neural content. Some of these choices are reflective of action, e.g., play piano. They need to be properly ASOC'd to clumps to make the decision process possible.

Social Icebreakers

Each of these neurons has one or more ASOCs that can be associated with it. To correctly select from the list of these, it is again necessary to match the ASOCs with the current internal conditions. I.e., if the subject is a movie, a method will have to be defined—probably with ASOCs—to select the proper small item (from a list such as this), then to select the proper option (e.g., "movie") from the small talk item itself.
What do *you* think of the <movie, restaurant, party, topic>?
Tell me about the best vacation *you've* ever taken.

What's *your* favorite thing to do on a rainy day?

If *you* could replay any moment in your life, what would it be?

As with Business Icebreakers, a substantial set of these is included in a text file as part of neural content. Some of these choices are reflective of action, e.g., play piano. They need to be properly ASOC'd to clumps to make the decision process possible.

Respondent's Assessment of the Icebreaker

When we are on the listener side of an icebreaker to a conversation, make assessments and decisions in the following manner:

Size the person up.

Determine if we are in a mood to chat.

Gauge whether it is worth our investment of time.

Engage or disengage in the conversation.

Cold-Inits of a Conversation

Starting a "from scratch" conversation is helpful at a meeting, party, reception or family reunion. The essential parts of it are:

Look around the room when first entered.

Make eye contact and be the first person to smile.

Use an ice-breaker remark or question. For ASOCs on the icebreaker, use list of topics presently in the context pool to isolate associations with the most promising ones.

Initiate conversational dialogue along a topic lines.

Dig deeper if the conversation wanes.

Continue the conversation using the methods outlined herein.

Initiating (or Continuing) Conversation Along a Topic—Asking Open-Ended Questions Open-ended questions to a group of people stimulates conversation between them, lets the individuals of the group be the focus, and permits you to learn something about them. It makes them comfortable (they're talking about themselves) and puts them at ease for conversation with you. Some of such questions include the following:

Describe for me <topic>.

Tell me about <topic>.

How did you <action_topic>.

What was <that_topic> like for you?

What brought you to <topic, place, locale>?

Why? (Assumes a strong topic or assertion.)

Some of these options assume the known state of a previous conversation or topic, and extend the conversation along derivative lines.

Continuity of Conversation

Once a conversation has been so initiated, it will play out in some manner and then possibly begin flagging. There are then "continuity questions" that may be asked, both from the personal and professional sides.

Continuity Questions—Personal

The following are alternative ways to bypass clichés and normally-expected questions used for small talk. Some require prior knowledge of the topic or analysis of the Responder's replies:

What went on for you today? <if positive> What made it <great, good>? <if negative> What went wrong?

How was your summer? <reply> What special things did you do?

How were your <holidays>? <reply> How did you celebrate?

Tell me about your <business, work, family>.

Tell me about your favorite hobby.

What was the best part of your <weekend>. What went on for you this <weekend>?

How was your weekend? <reply> What did you do?

Other methods include analysis of the topic content of the Responder. All of these provide basis for follow-on questions. The approach is this:

Cull or track topics arising in the respondent's comments.

Look at both negative and positive elements of ASOCs and relns.

Pose a question or observation based on those elements.

The above processes require hard-wired logic to implement, although its elements may be sequenced from a neuron. For example: "I hate being an engineer" is casting negatives on the speaker's experiences in the area. Both types of emotion-laden issues are materials for W-H questions relating to the topic, and pull the conversation forward.

Continuity Questions—Business

The following is a sampling of questions suitable for maintaining continuity in small-talk personal conversations. A complete list is found in the text file:

How did you get started in your business?

How did you come up with <this> idea?

What got you interested in <business function, job, industry, idea>?

How has the Internet impacted your profession as a whole?

There is a difference in appropriate questions between a professional (any profession) and a business owner or manager. As before, the appropriate connections to the questions should be made with ASOCs so they can be culled in a manner appropriate to the present context and pool content.

Vision-Based Question Opportunities

Other opportunities exist for brains with vision recognition. This free-for-the-taking information for asking W-H questions includes:

Cast on a broken limb.

A T-shirt with specific logo or text.

Office decorations

Diploma with graduating school.

Sports object, e.g., golf ball.

A trophy.

Someone is left-handed.

Someone has beautiful hand-writing.

A piece of art or a picture.

Some of these require optical correlation and the ability to ascertain what type of object is being perceived. These can be ignored in the short run, but must be accounted for when these visual skills have been developed.

Behavioral Analysis Question Opportunities

On the analytical side, there is opportunity for asking WH questions based upon observed behavior. These can include perceived intent:

Use of anger, pleasure, frustration, happiness (emotion or feeling) words.

Perceived intent to annoy.

Perceived intention topic.

Perceived argumentation.

Perceived making of a point.

Perceived genuine inquiry.

Other analyses or perceptions and their topic.

The above list can be extended to include all results from awareness and expectation pools, too. Use of our internally-firing emotions (particularly negative ones) can lead to bad conversational methods. Enable their use for proper emulation of non-disciplined people.

Use of Body Language

One analyst in non-verbal communications asserts that communication is 35% verbal and 65% non-verbal.

Body Positions for Positive Messages
Positive messages are conveyed by the following positions:
Lean forward.
Maintain eye contact.
Open up your arms and body.
Relax you body posture.
Face your partner.
Nod and smile.
Body Positions for Negative Messages
Negative messages are conveyed by the following positions:
Pointing.
Covering your mouth.
Rubbing or fondling body parts.
Fiddling with jewelry.
Tapping a pencil or pen.
Swinging your leg.
Crossing arms about your chest.
Putting hands on your hips.
Glancing away from the person who is speaking
Listener-Side Verbal Cues He is Listening
Some short feedback lines tell the speaker that the responder is actually listening. These are listed in FIG. 12.
These can be set up with proper ASOCs to ensure the proper element is selected and presented.
Transition into New Topics
When the intention is to transition to a new topic, the following are some options. They can be configured with ASOCs to properly select them. These methods convey that you are listening and connected, and that you want the responder to continue speaking with you.
That reminds me of <new_topic>.
When you were talking about <topic> I remembered <new_topic>.
You know, I was just reading in the paper about <new_topic>.
I've always wanted to ask you <new_topic>.
I thought of you when I heard <new_topic>.
Do you mind if I change the subject?
There's something I've wanted to ask of someone with your expertise.
Constructing Paragraphs
For the runtime construction of paragraphs, the following information can be used:
Organizing Paragraphs
The following paragraph types are all defined in the text file:
Illustration
Question and Answer
Narration
Definition
Classification
Cause and Effect
Analogy
Paragraph Length
Consider your purpose.
Consider your audience.
Consider your medium.
Opening Paragraphs
Begin with a narrative.
Begin with a description.
Begin with a question or a series of questions relating to topic.
Begin by quoting a key source.
Begin with your thesis.
Closing Paragraphs
Summarize the main points.
Make a recommendation when one is appropriate.
Link the end to the beginning
Place your argument in a larger context.
Stop when you're finished.
Transition Words
To Show Similarity—Likewise; Like; Similarly; In the same way; Just as
To Show Contrast—However; Instead; Nevertheless; Although; In spite of; On the other hand; Not only; But; Rather
To Show Accumulation—Moreover; In addition to; For example; And; For instance
To Show Consequence—Hence; Consequently; So; Therefore; As a result of; Thus
To Show Causation—Because; Since
To Show a Sequence—Next; Subsequently; After; Finally; First, second, third
Constructing Sentences
The following are the basic sentence patterns dealing with subjects, verbs, and direct and indirect objects. Other parts of the sentences (indefinite or definite determiners, adverbs, etc) can then be filled in around these.
Subject+Verb (Intransitive)
Verb does not require an object to complete its meaning Verb doesn't allow passive.
"The bride ran."
"The cows mooed."
"All the children smiled at once."
Subject+Verb (Transitive)
Verb requires an object. Verb allows passive.
"The lawyer accepted the case."
"The heavy rains destroyed the levee."
"The case was accepted by the lawyer."
Subject+Verb (Linking)+Subject Compliment
A compliment should be compatible with its subject.
"The lawyer became a federal judge."
"The storms seemed endless."
Subject+Verb (Transitive)+Indirect Object+Direct Object
IO explains for whom or what an action is done or directed. They ordinarily precede direct objects.
"The lawyer found the clerk a job."
"The storms brought local farmers needed rain."
"The children told their parents stories."
To change the placement of an indirect object requires turning it into a prepositional phrase.
"The lawyer found a job for the clerk."
"The children told stories to their parents."
Subject+Verb (Transitive)+Direct Object+Object Complement
"The lawyer called the verdict surprising."
"The flood caught the town napping."
"The children found their spinach vile."
Creating Monologue
When a user asks the emulated brain to explore a subject, the emulated brain sets the subject as the Topic Nid. From that Nid it will gather a wealth of knowledge and describe it to the reader in a comprehensive manner.
Consider the Context
Most Nids have a vast amount of relns and clumps, so narrowing the subject down to a particular path is extremely important—otherwise we would simply produce a stream of consciousness narration, which may be amusing but probably would not be what the user wanted. First look at the context pool to see if anything is in there.
If there isn't, ask for something—"What do you want to know about <Topic_Nid>?" This question might also be asked if a scan through an existing context pool doesn't yield anything relating to the Topic Nid. The answer to the question should be added to the context pool, along with other words relating to it. Once a Topic-Relevant Context exists, it is time to explore relns.

Capture Meaningful Relns

Use the context to capture appropriate Nids immediately within the Nid, then cull through them to find more Nids. Consider doing this for seemingly irrelevant Nids in Topic Nid because they might lead to relevant ones further down the line.

Any direct match (between context and within Topic Nid) gets a score of 1.0, whereas the score decreases depending on how far you have to go to find relevant Nids. Each time an Nid is put into a link, the relationship between it and the previous word are also recorded. For instance, we want to remember that "Earth" is R_MADEOF "Core."

After putting these into a content_list, sort them by relns. We should then have groups of R_MADEOFs, R_CHILD, R_CAT_MEMB_OF, etc, and they will be in order of their score (already established through a search). (We might want these groups of relns to be within separate links) Scan through each reln type and look for two things: amount of content and score.

If the score is 1.0, the nid on the end of that reln has just become a sub-topic. If the score is lower than 1.0, but this pool has a considerable amount of content, we will want to talk about it anyway—because we can.

Forming Sentences

Begin with the main topic, the Nid given originally. Look at the relns between it and the subtopics and find the appropriate verb to describe them. Now that we have a verb, we have the option of running it through the Verb Thesaurus—do so at your own discretion.

Retrieve the PAS of the verb, and this will tell you what roles our two Nids will play. The subject/object rules can tell us what the sentence order needs to be. Once we have this information, we store it inside a sentence link, which may give us something like this:

| "Earth"  | R_MADEOF "core"                                 |
|----------|-------------------------------------------------|
| subj:    | earth                                           |
| verb:    | make                                            |
| taspect: | passive present (this must be hardcoded per reln) |
| obj:     | core                                            |

After a few sentences are accrued and the emulated brain is ready to explore the sub-topics, store all the sentence links in a paragraph (link/pool?) and mark its place in our monologue (intro, support1, support2, closing). Supporting paragraphs might have a slightly different process than the introduction, but for now the same form can be applied. Note that, when regenerating the paragraphs, at the end of each do a carriage return and indent.

Explore the sub-topic the same way you did the topic, storing the information in links along the way.

Paragraph Regeneration

Once the paragraphs are full, regenerate them in order. The introduction, supporting paragraphs, etc. One will want to work out style issues, such as transitions among paragraphs and sentences. The closing paragraph will be a rephrase of the introduction—same content, but with different verbs and nouns.

Methods of Response

When someone hears a statement or a question, he can respond in a few different ways. The first way is to respond with his own statement, related to something in the other's statement. For instance, if Susan says, "I had to change my daughter's diaper six times today, and Brian broke his arm on the youth group's ski trip," the person she's speaking with can respond to any topic in the sentence. He could talk about changing diapers, or ask about Susan's daughter or son (Brian), or talk about breaking his own arm as a kid or enjoying youth group but never having been skiing, etc. Out of the many options that present themselves, however, he should have awareness that breaking a bone is serious and he should take interest in Brian's health and recovery. The second response to Susan's statement is to ask her a question about the topics she has just presented. As was already mentioned, Brian's health takes precedent for the first question, but once the responder knows Brian is on his way to recovery, the responder can ask about other topics—"Well, how's your daughter then? Is she ok?" The third response is ignoring the statement. This could be with a gruff brush off—"I'm too busy to care right now, Susan"—or maybe a harsh "who cares?" The point, however, is that response is a temperament dependent area, and which method is used (as well as the method's content) depends on the responder's disposition at the time.

Using Statements

Generating a statement is similar to generating a monologue, except the length is reduced to a few sentences (at most) rather than multiple paragraphs. Begin by examining the clump and recognizing "Brian broke his arm" is serious (ASOCs to "Serious"?). Then start gathering topic Nids from Susan's statement. This will fill a list with "change, daughter's diaper, Brian, break, arm, youth group, ski trip" and related words. Whichever word is chosen is culled, filling a list with related words, as well as the reln connecting them. Now enough information should be present to return a counter-statement to Susan. In this case, since Brian broke his arm, the counter-statement might be, "Breaking an arm is terrible." (This result is likely to come from clump space; otherwise it might require use of deductive logic to know that breaking a limb is bad, and an arm is a limb . . . ) After putting out a counter-statement, the next step is to wait for a response. If a response doesn't come in time, ask a question about what was just said to encourage conversation—"Is Brian alright?"

Asking Questions

The question we ask depends on what we want to express. Questions, like statements, tell something about our state-of-mind and communicate about ourselves—whether we want them to or not. Before choosing a topic to ask about, we should be aware of its significance, as seen in the "Brian broke his arm" example. A statement like that should trigger an immediate reaction of "Is everything ok?" Otherwise, the topic we choose might be based around what we're equipped to discuss (what we know about). If we know about something, we're more likely to make statements. However, if we choose a topic we are unfamiliar with, we will be inclined to ask questions to learn what we do not know—"How long has Brian been in the youth group?" The questions are based around missing information and topic. We set "Brian in the youth group" as our topic, and look for blank spaces. When we check for information based on "Brian" and "youth group," we discover we do not realize how long he's been in the youth group, and we generate a question based on that.

Ignoring Statements and Questions

Some reasons for ignoring statements and questions include temperament. If Susan has a reputation for gobbling up pity from folks, and we've had our fill of showing pity for pity-globberers, we might decide to ignore her comment about "Poor Susan." Keeping track of our emotions allows us to recognize when we don't feel like talking, and keeping track of our morals allows us to recognize when we should talk anyway (e.g., Susan needs reassurance). We might also ignore a question or statement if they are offensive, threatening, or contain presuppositions we do not wish to address. In this case, we bow out gracefully—"I'm sorry, I'd rather not talk about that" or something of that nature.

Figure 13:
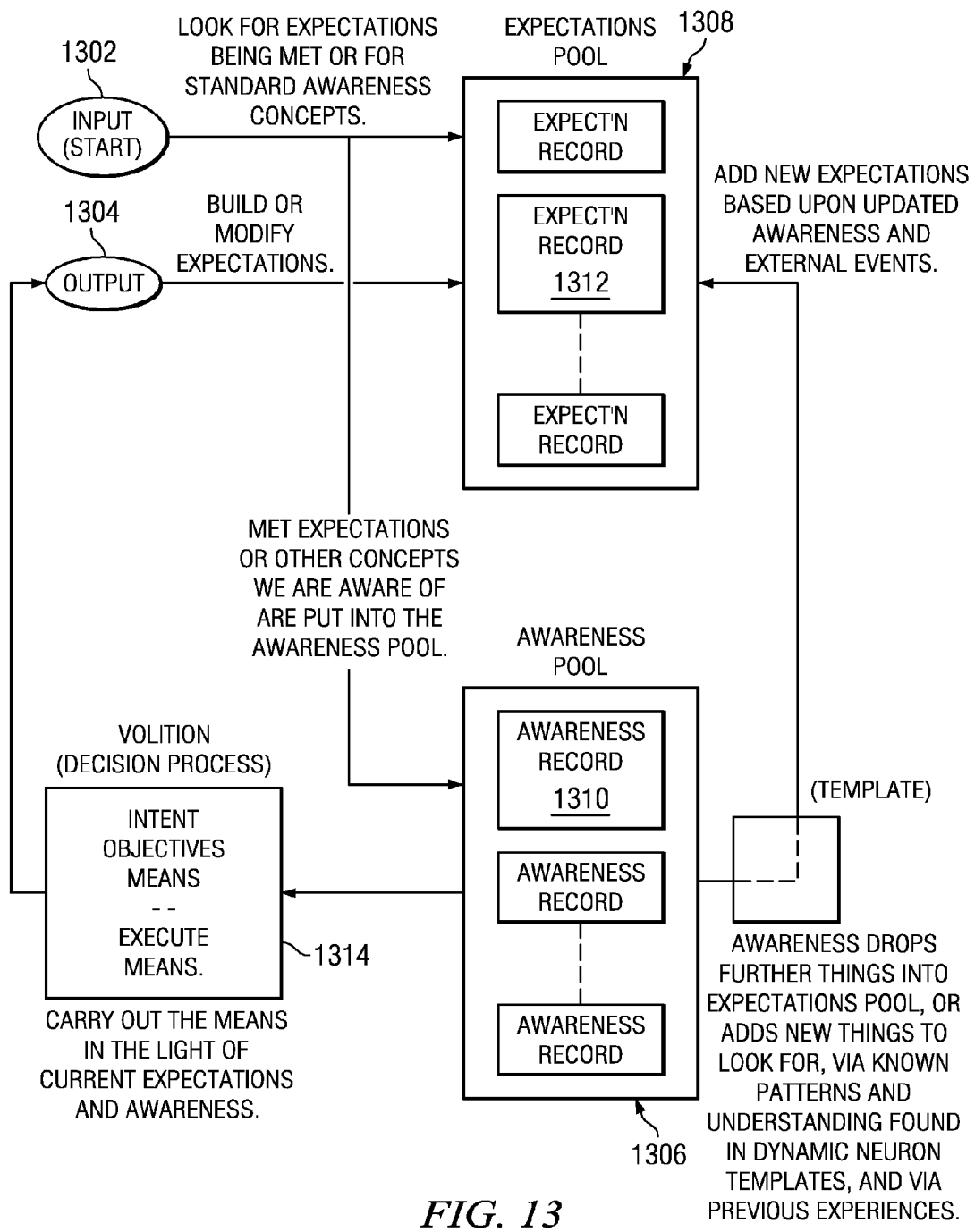
FIG. 13 illustrates a diagram for exemplary Discussion Drivers and Expectations Flow.

Discussion, Awareness and Expectation Drivers: The general flow of control is shown in FIG. 13. The general flow of control is shown herein FIG. 13, which is described in detail in U.S. patent application Ser. No. 12/344,312, filed Dec. 6, 2008, and entitled DISCUSSION PATENT, which is incorporated herein by reference in its entirety. The Input node 1302 is entered periodically as part of a background process. The Output node 1304 is simply a visual marker to indicate the results of the discussion process. An example of new expectations being added to the Expectations pool is the template of state change within the discussion process itself. Example Flow:

| | |
|---|---|
| Input: | "Hello!" |
| EXPECT | Conversation |
| EXPECT | Identity |
| Awareness | Greeting |

Load a greeting from a dynamic template. (E.g., Humor, Identify ourselves, Ignore)

| | |
|---|---|
| Decision: | Greet back, Identify, Question identity |
| Output: | "Hi, my name is Luke! What's yours?" |
| EXPECT | Identity |
| EXPECT | Answer |

The flow in FIG. 13 is a process that may be initiated by multiple causes, including a regular time interval, speech, external conversation or by a need such as loneliness or boredom. An incomplete list of these needs includes security, adventure, freedom, exchange, power, expansion, acceptance, community, and expression. These initiators also include personal desires and requirements unique to the individual.

Context Pools: The context pool is an area of short-term memory within the brain that is actually a collection of sometimes-unrelated pools of knowledge. Two such pools relevant to discussion and volition are the Awareness and the Expectations pools. The Awareness and the Expectations pools retain the states of awareness, dialogue and volition in a form, separate from the neurons of the rest of the system. The Awareness and the Expectations pools interconnect with neurons of various types, yet are separate from the neurons.

Some of the neuron types Awareness and the Expectations pools connect with are: Normal neurons—Concepts, classes of objects and instances of classes; "Clump" neurons—Actions, similar in content to an independent clause in a sentence; Experience neurons—Place-holders for experiences, expectations and emotional associations; Identity neurons—Names, faces and matters of specific personal identity; and Time neurons—Relative or absolute time, or time duration and interval. Additional neuron types may also be connected to by these context pools.

Figure 14:
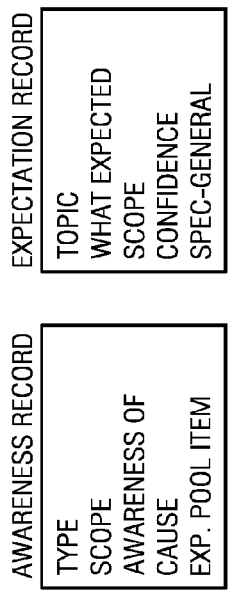
FIG. 14 illustrates a diagram for exemplary Awareness and Expectation Records.

The general content of a record for each of the pools is shown in Table 1 and FIG. 14. Each may contain additional house-keeping data appropriate to it. They may be organized into either arrays of records or into linked lists, but the linked lists are simpler from the vantage point of dynamic memory management. Each of these is detailed in the sections that follow The Awareness Pool: The awareness pool 1306 tracks concepts or conditions of which an individual is intellectually aware. Each concept or condition comprises one record in the awareness pool 1306. Because of their nature, separate neurons define each concept or condition.

An example of applying the awareness pool 1306 occurs where an individual may routinely encounter a person who likes to attack the individual with statements masked by humor. The individual's awareness regarding the person's statements masked by humor entering into the conversation or encounter allows the individual to have more information on which to make their decisions. The occurrence of the individual being confronted in conversation by the person pre-loads the awareness regarding that person's statements into the pool (as well as expectations into an expectations pool 1308).

The "pre-loads" of awareness into the pool 1306 are derived from awareness templates or expectation templates attached to the relevant neurons. A simple example of these templates can be seen in the expectations pool 1308 used during the parsing of a sentence. When the word "the" is encountered, the word "the" has an association with the determiner neuron. At template stored inside the determiner neuron expects a noun or adjective to be the next word.

Awareness pools trigger events, resolve concepts and trigger special handling conditions. The elements of an awareness pool record are illustrated in Table 1:

TABLE 1

Elements of an Awareness Record

| Awareness Element | Description |
|---|---|
| Type | Type of awareness: E.g., Discussion flow, answer, sales job. Examples of these are detailed in Table 2. |
| Scope | Scope this awareness is applicable to: E.g., Neuron, semantic clump, experience, identity. Examples of these are detailed in Table 3.. |
| Awareness_Of | What we are aware of (the ID for some form of neuron) |
| Awareness_Cause | An ID for neuron of the given scope that made us aware (ordinary neuron, clump, identification, experience, etc.) |
| Expectation | Indicator of the expectation pool item/record that this awareness came from (or is associated with). |

The above IDs (such as for Awareness_Of or Awareness_Cause) represent short-term connections neurons, connections removed when the awareness goes out of scope or diminishes because of time.

Specific type codes are associated with each awareness record. The code defines the type of material requiring an individual's awareness at various stages in discussion, analyzing and conjecture. Tracking changes in the type of material is a useful indicator of the changes in the state knowledge, discussion and interaction with the environment surrounding the individual. Some of these types are given in Table 2.

TABLE 2

Types of Awareness

| Awareness Type | Description |
| --- | --- |
| Answer | This item represents the awareness of an answer to a question or remark. |
| Discussion Flow | This item represents our awareness that there is a present flow of discussion in progress. |
| Point Being Made | This item represents a specific point being made. |
| Specific Concept | This item represents awareness of a specific concept or topic. |

The scope of application for any item of awareness is very specific. For example, when reading a document or engaged in conversation, the scope may be associated with a paragraph. The item of awareness may result in a summary phrase that encapsulates the content of the paragraph. It the case of a summary phrase, the item of awareness would be specified in a controller clump neuron (a sequencer for a series of semantic clump neurons), or an outline clump that gives a larger-view picture of where the textual material is heading.

Also, should someone make and insult, such as "You are a jerk!," the awareness record indicates awareness of an intended insult at the semantic clump level. The mere awareness of the insult does not imply the decision to be "insulted." Although further analysis and assessment may cause an individual to be insulted. That is, the awareness that someone is insulting the individual is not the same as actually being insulted. If the individual decided to receive the insult, the volition logic will record the emotional stamp with the clump, or other neuron, that records the outcome or result of the analysis.

The following Table 3 defines representative scopes for a specific awareness record.

TABLE 3

Scope of Awareness

| Awareness Scope | Description |
| --- | --- |
| Word | Awareness of a specific word (while it is being parsed) |
| Concept | Awareness of a concept (normal neuron) |
| Role | Awareness of a specific semantic role being used or played out |
| Semantic Clump | Awareness of an action, equivalent to an independent clause |
| Controller Clump | Awareness of a specific sequence of semantic clumps (clause sequence) |
| Outline Clump | Scope is of an outline for a topic (e.g., "Where is this book going?") |
| Question | Scope is for a specific question being asked or answered |
| Experience | Scope is for a specific experience (neuron) |
| Thought | Scope is for a specific thought. |
| Dream | Scope s for a dream. |
| Training | Scope is for specific training being given |

TABLE 3-continued

Scope of Awareness

| Awareness Scope | Description |
| --- | --- |
| Temperament | Scope relates to a specific temperament under consideration |

While other scopes and types of awareness exist, skilled artisans will appreciate that these are representative, and can be implemented as named enumerations of the type or scope. These scopes and types of awareness can also be represented by other methods such as the pre-known serial numbers of the type or scope concept being referenced.

Adding Awareness Records. A new awareness record 1310 is added for each new entity that enters the field of awareness, such as in entering a room. Merely scanning the room and focusing on an object adds that object to the awareness. New awareness records 1310 are created by hearing words (e.g., as portions of a sentence), having unusual events occur, or as the result of other thoughts. Going outside the scope that caused the original awareness (e.g., the sentence was completed), causes the relevant awareness records to be forgotten. Any unfulfilled expectations associated with the forgotten awareness records are also forgotten.

The Expectations Pool. The expectations pool 1308 holds current expectations and a level of confidence that the expectations will be fulfilled. Changes in external events and awareness create, or augment, the records 1312 of the expectations pool.

The process of building out the expectations begins with inter-neuron associations relate to the current topics or awarenesses. "Culling" is a process by which selected neurons (such as those indicated in an awareness record) are scanned to see to what other neurons the selected neurons may be connected.

Inter-neuron relational connections in this brain model are type-coded, based upon the intended usage and purpose of the inter-neuron relational connections. This enables an operation that is equivalent to selective firing of attached neurons base and that differs by purpose and intent. Such types may define, among other things: Loose associations; Group membership; and Parental/child/sibling lineage.

Many scores of such connection type codings actually exist. The existence of the multiple connection type codings provides a rich opportunity to selectively identify neurons connected to an individual by the connection type. Scanning a neuron for selectively-related connected neurons is the process of "culling". Culling on association, group and member relational connections places new items into the pool of expectations.

For example, processing of current awareness leads to the start of a discussion. A new discussion triggers an event to cull expectations for the discussion. The first pass culls the discussion neuron for associations and sets the associations as expectations. The second pass addresses current context and identities involved in the discussion to set further expectations.

Emotional expectations in the experience neurons are set in response to dealing with experiences and experience neurons ("expers"). The emotional expectations in the experience neurons are set at their creation time based on past experiences and emotion stamps. This functionality occurs with non-emotional expectations as well.

Culling the "discussion" may create the expectation of: greetings, facts, opinions, emotions, points, logic and other elements. The template should define separate expectations based on specific ranges of the certainty emotional gamut. Experience changes and updates the certainty. In essence, the expectations are created for particular concepts that tell us how much to expect it in a given circumstance.

Certain conditions exist at the time in which the creation of the expectation entries is tripped off. The value of the certainty emotional neuron may define the likelihood that this expectation will happen. For example, in a debate, some tactics may be expected that are not normally expected in a normal conversation. Expectations, such as the tactics that may be expected in a debate, are awareness expectations such as possibilities, i.e., expectations that the individual is not absolutely certain will occur. At the onset, occurrence of the expectation is only a possibility.

Causes of Expectation. As discussed hereinabove, expectations are largely triggered by awareness. For example: Jack just entered the room, and the recognition of him creates an appropriate awareness record. It so happens that Jack has a passion for dry humor, and when he makes a joke, its timing sometimes catches Bob by surprise, such that Bob does not see the humor in it. The experience with Jack, though, is that he sometimes smirks before saying something funny, ("I know something you don't know."). This is "Jack's smirk" and is represented by a Jack's Smirk neuron. When Bob sees a smirk on Jack's face, the combination of smirk and Jack trigger the Jack's Smirk neuron into the Bob's awareness pool. Experience has trained Bob to expect Jack's attempt at humor when Bob sees the smirk. In the Neuric Brain Model, this is implemented as an expectations block record stored with the relational connectors ("relns") in the Jack's Smirk neuron. Therefore, when that neuron enters the Awareness pool, any expectations kept with it are loaded into the Expectations pool.

Other expectations can be caused by various conditions and events within the brain, including the firing of some emotions such as anticipation. The records from some such causes do not come from templates, but may be "pre-wired" as subliminal events.

The Expectations Record. The elements of an expectations record 1312 are shown in Table 4. One such record is created for each new expectation.

TABLE 4

Elements of an Expectation Record

| Record Element | Usage |
|---|---|
| Type | Type of expectation. See Table 5 for exemplary types. |
| Expectation Topic | Topic of expectation (e.g., "favorite movie"), a neuron of any type. |
| Expectation Value | What is expected (e.g., "matters of the heart"), a neuron of any type. |
| Scope | Scope of expectation (experience, concept, semantic clump, outline clump, etc.) |
| Confidence | Confidence the expectation will be met |
| Specific | Expectation is specific or general. E.g., to expect our happiness emotion to increase is very specific. |
| Active | This expectation is actively being acted on. |

Descriptions of the elements of the typical expectation record follow. Some typical (enumerated) expectation types are given in Table 5.

TABLE 5

Examples of Expectation Types

| Type | Meaning |
|---|---|
| Parse Word | Expect to parse a word |
| Parse Phrase | Expect to parse a phrase |
| Question | Expect to ask a question of the other person. |
| Answer | Expect to answer the other person's question or comment. |
| Emotion | Express or evoke a specific emotion. |
| Outcome | Expect to establish or determine the outcome of the current situation. |
| Resolution | Expect resolution of the current issue. |
| Statement | Expect to make a statement. |
| Experience | Expect a specific experience. |
| SC Concepts | Expect to summarize events into a semantic clump (like independent clauses) |
| CC Concepts | Expect to summarize events into a sequence of semantic clumps ("controller" clump) |
| OC Concepts | Expect to summarize events into outline clumps (synopsis of events) |

The expectation topic and value are ID links to a variety of neuron types, indicated by their name. Expectations are either specific or general. A word may be expected to resolved, but not known into what the word will be resolved. For this case, the Specific element would be false. On the other hand, to expect a happiness neuron firing to increase would be specific.

Current firing levels of the certainty emotion determine the confidence level that each expectation in this list will happen.

The Creation Process for Expectations Pool Records. Expectations are built up by searching neurons added to the Awareness pool for certain types of relationships, typically (but not exclusively) for ASSOC relationals. The term neuron used here simply describes place-holders for concepts, one concept per neuron. Connections between neurons are type-coded "relns" stored in the "from" neuron and pointed to the "to" neuron to which the "from neuron" is connected. Bi-directional relationships are implemented as a $2^{nd}$ reln in the "to" neuron that points back the "from" neuron. The ASSOC is simply one of many such types of relns.

Neurons are substantially disorganized collections of concept place-holders, but interconnected with other neurons in multiple manners. Some of these reln connections are "vertical" in the sense of hierarchical parent-child relationships. Other reln connections are more sibling-like in the relationships, such as reln connections showing relationships to other members in specific groups. Some reln connections show "made-of" or "part-of" relationships. Yet other reln connections are directionless, only implying some defined unique relationship that is needed.

Expectations are found by culling through all relational connections of a neuron to find those of specific interest to the topic or awareness. ("Culling" is described elsewhere in this document.) Specifically, a "sideways culling" of connections (i.e., ignoring vertical parent/child-style connections) on associations, groups, or group members will put new things into the pool of current expectations.

Example: Starting a discussion. A new discussion triggers off an event to cull expectations for the discussion. The first pass culls the discussion neuron for ASSOCs and set those to expectations. The second pass addresses the current context and identities involved in the discussion to further set expectations.

When the neuron being culled is an exper, emotional expectations set in the expers at creation time based on past experiences and emot stamps. Non-emotion expectations are set the same way.

Information such as: greetings, facts, opinions, emotions, feelings, points, logic etc are culled from the discussion. The expectation template further may hold different values based on the range on the certainty gamut. Such values are changed or updated based on experience. Effectively, a stamp of sorts exists in these concepts to inform how much to expect in a given circumstance.

Different types of dialogue or discussion are defined by the expectation stored in the neurons that drive the discussion. For example, in a debate, some tactics may be expected that would not be expected in a normal conversation. These are awareness expectations that are possibilities, such as occurrences that an individual is not certain will occur. The possibility of the happening is the only expectation. The expectations template for the Awareness-pool neuron triggering the current expectation indicates what to use to set the Confidence marker in the expectation record.

Intents and Goals. There are many intentions for conversation that determine the form and content of the discussion. These intentions change on a dynamic basis. While in the middle of a conversation, one may be interrupted by a telephone call or by a person not in the conversation. Some typical goals are illustrated in Table 6.

TABLE 6

List of Typical Intentions

| Intention | Description |
| --- | --- |
| Start Conversation | Intent on ending a discussion. |
| End Conversation | Intent on starting a discussion. |
| Continue/Resume | Intent on continuing a discussion. |
| Greet | |
| Thank you | |
| Observe | Intent on just observing a discussion of some sort. |
| Convince | Intent on convincing, selling, or changing someone's mind. |
| Dialogue | Intent on discussing, find out about someone's belief, share your own, knowing more about someone. |
| Debate | Intent on debating, the goal of which is to win! |
| Annoy | Intent on annoying the audience (raising emotional levels). |
| Argue | Intent on arguing, not to be right, but just to argue. |
| Have Fun | Intent on having fun, however your temperament does that. |
| Be Polite | Intent on being polite. |
| Impress | Intent on impressing, exuding a favorable image. |
| Learn | Intent on learning something. |
| Share | Intent on sharing something you know. |
| Brag | Intent on bragging on something (perhaps yourself, your child). |
| Curiosity | Intent on discovering unknowns or learning more about something/someone. |
| Hurt | Intent on hurting someone |
| Relax | Intent on relaxing, decompressing, blowing off steam etc. |
| Humor | Intent on a humor (ie like retort). (This can be an intent, or a means.) |
| Random Fact | Blab out a random fact. |
| Barrier | Barrier used to start other experience related intentions. |

Questions and Their Handling. Part of dialogue and thinking (volition) is to ask questions. A category of questions addresses the matters of who, what, when, where, why and how; i.e., the "WH" questions. There are other question types besides this. The three elemental aspects to questions are:
  Analyze what is being asked, such as WH issues (part of volition).
  Determine the type of response of choice.
  Formulate the response.

Each of these aspects can be handled relatively independently of each other. As with any type of dialogue, the ultimate approach to the response is summarized by:
  Objective (motives and goals)
  Intent
  Means (methods of achievement)

Question Analysis: The question analysis is partially performed by the parser, which determines which of 5 basic questions is involved. The original format of the question may convey several types of information: the actual question and expected type of response. "I think it's going to rain today, don't you?" implies that a yes-no answer is expected. "The Red Sox may win the World Cup this year. Don't you agree?" is rather a loaded question, a restatement of sorts. The proposition that the Red Sox are eligible to compete for the World Cup evokes an emotional responses of confusion and disagreement. The expected answer is again a yes-no case and is readily given by polling the emotions.

Regardless of the format of the actual question—including the various inversions of phrasing within the sentence—the parser and conceptualizer operations that precede question handling deliver a "normalized" question format to the question analyzer.

Actual analysis of the question determines what type of question is being posed and what the truthful answer might be. Of these, how questions generally have the least obvious answer. However, how questions use the methods of this dialogue and discussion handling to deliver or conjecture the truthful answer.

| Determination of Response: | When a question is posed, there are five fundamental responses: |
| --- | --- |
| Tell the truth | Tell the truth, or what we know it to be. |
| Tell a lie | Lie, from stretching the truth to a whopper. |
| Ask a question | Pose a question back. |
| Divert | Divert from the question (Change the topic.) |
| Ignore | Do nothing. |

The questioner has motives in asking the question. The brain model has motives in developing the answer. The above types of response do not speak to motive; rather, the types of responses are means (methods) for carrying out one's motive. Each method carries its own associations and implications. Obviously, the method (means) must be chosen wisely.

Volition (Decision Processes): Referring back to FIG. 13, the Volition block 1314 rather quietly encapsulates the decision processes. This includes the elements of:
  Assess intent based upon speaker, conversation phase, audience, and active neurons
  Assess objective(s) based upon intent and timing; and
  Determine a Means of Achievement Some of the intent and objectives are listed in Table 6. Multiple ones may be present at the same time. The intent and objectives are analyzed as discussed elsewhere and include analyzing the present situation and its needs for decision. The result may therefore be a reactionary decision that further alters the intent or objectives.

The general flow of this block is as follows:
Perceive the current situation and needs for decisions.
Build a pool of possible specific decisions as they relate to the current situation.
Analyze in the light of our personal requirements and needs.
  Possibly conjecture for further needs, in the light of our personal requirements, needs and the situation.
  Possibly further analyze for more options from which to choose.
  Possibly conjecture further option from which to choose.
Generate a possible-decision pool until we are satisfied or must make a decision.
  Possibly override the decision by gut feel, conscience, external guidance, or societal deference.
Make a final decision.
Carry out the means, circulating the decision actions to relevant pools, and set up appropriate trigger mechanisms.

Much of the above decision process is oriented towards developing the means to carry out a decision, which may include the processes of conversation and discussion. A substantial portion of the information and knowledge involved in these processes is contained in the awareness and expectations pools.

Awareness alone is insufficient to understand and respond to the nuances in human conversation. The analysis of awareness to a deeper level allows humans to answer why, incomplete it may be. Each level of analysis adds to awareness. An individual is only aware of what that individual is aware. Each iteration of analysis drives to a closer understanding of the why.

At certain points in this process, the clarity exists to summarize awareness in one of a variety of ways, depending on present state. The summary may be made in the form of a simple neuron connection set, as a semantic clump-neuron (i.e., similar to an independent clause), a controller/sequencing clump or as an outline clump. Whatever the case, the observation can be tagged with an internal observation type.
For example:
Matt says to Nate: "You are a jerk!"
Internally, Nate recognizes he is probably being insulted.
He assesses how this makes him feel.
He thinks, "I can't believe Matt said that! I thought we were friends!"

These thoughts, with what was said, it context and internal state variables, drive Nate's response. Nate may retort, ignore the comment, ask why, or end the conversation. In any case, none of Nate's reasonings are stored until a special neuron clump is first created and that is tagged as an internal thought/observation that explains the why. This is derived from the analysis process of FIG. 13.

Audience and Speaker Assessment: The speaker and audience may consist of multiple personalities, all of which are aggregated into lists in the Context Pool. The identities of the speaker and audience are each assigned a neuron that represents them. The IDs of these neurons ("NIDs") are a central part of the pool list content.

Informal Logic: There are two logic engines at work in the Neuric Brain: informal and formal. Formal logic is the basic nuts and bolts of logic: if, then, and else. If this is true, then that must be true. Informal logic is a bit more complex due to its informality. Informal logic cannot be accurately captured in a system of symbolic representations.

In the Neuric Brain, more emotion-connected (human like) understanding makes use of informal logic. The "logic engines" recursively analyze the dynamically growing pools of awareness and expectation. Each additional pass through the pools adds an additional layer of awareness and expectation. This "introspection" causes more expectations and more awareness to be added such that the process cascades on itself Pools of the type discussed hereinabove are linked lists of neurons, clumps and other data related to the context of the conversation. The pools also include experience neurons (described hereinabove) that define assessments of previous experiences and expectations for the future based upon them. In their composite, these lists form the basis of the brain's awareness.

In any discussion, the agent is aware of some things, and is expecting some things. At the most basic level, informal and formal logical truths can be gleaned from a clump, or thought. These clumps, or thoughts, are the means in which communication is accomplished.

Sentences are used—via speech or text—for expression. These statements are loaded with intent, nuance, motive; the goal is to accurately break them down in context, ascertaining what is actually going on behind the speaker's words.

If awareness is evaluated at levels as L in block 1402 and the most basic level (L=1) is used as a start point, greater awareness emerges when internal questions are recursively asked of current awareness.

The key to the logic engines is asking recursively the internal question, "What does that mean?." For example, if someone said, "Your shirt is white." At L=1, awareness is only of the statement as it appears. When it is asked, "what does it mean?" at L=1, a pretty basic understanding is all that is obtained. The statement was expressed and the first task is to break it down and understand the statement "in a vacuum" as a complete thought. It seems quite innocuous and harmless at level L=1. However, when viewed from one layer up, this perception can easily change. Most informal logical understanding comes from recursively asking, "What does this mean?", but doing it again at an L+1 level of meta-data.

When the question "What does this mean" in block 1404 is asked, but with the awareness that someone just said "Your shirt is white," a previous sentence's awareness that the speaker had previously proposed something is discovered. The speaker had said, "All things that are white are ugly." With L=1 awareness of this previous sentence, and an L=1 awareness of the statement assigning the color white to the individual's shirt, the individual now becomes aware that the speaker is calling the individual's shirt ugly, L=2

Further, it can be asked again (recursively), "What does this mean?", on our L=2 awareness set. Now, what does it mean that someone is calling the individual's shirt ugly? (L=3) At greater levels of L, the details of what has been said are no longer being analyzed, nor what the details themselves mean. The higher L gets, the intent and motive of the speaker are more readily ascertained. For example, the individual may find that he has been implicitly insulted during the exchange!

Figure 15:
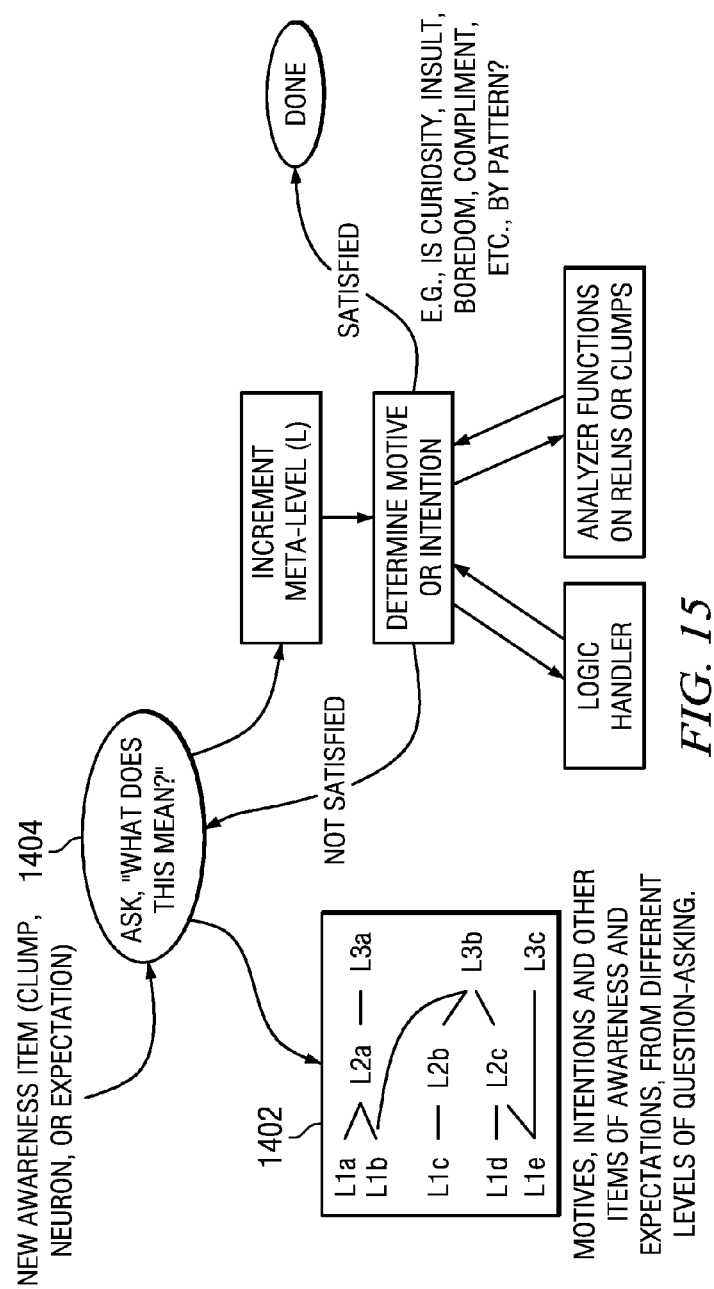
FIG. 15 illustrates a diagram for exemplary Informal Logic and Analysis Flow.

FIG. 15 shows the general flow from the time of a new relevant issue or awareness to the time its intention can be fully assessed. The result is an increasing pool of awareness items and any awareness items appropriate to current discussion and other states.

The higher the L, the greater other awarenesses in the context pool enter the play. As a result, finer nuances involved in human conversation begin to emerge.

Internal questions of level L=3 yield results that pertain to the reasons or motive of the insult. Perhaps the speaker will next ask to buy the shirt. Perhaps the speaker is jealous of the shirt. Perhaps the speaker is feeling insecure and feels a need to insult the wearer of the shirt. Perhaps the speaker is just joking.

The deeper one digs into awareness, the more likely walls will be encountered. Missing data is rampant. Missing information can be conjecting, or question can be asked to clarify. Conjecting is an inherently flawed process that yields subjective and often inaccurate results. Frequently, the intent and motive of our fellow human are misjudged. However, misjudgment is a part of humanness.

This process of classifying motive and intent occurs in every conversation, albeit at various degrees. From a child recursively asking "why," to the adult searching the internet for deeper understanding on newly gained understanding, this is a significant process of human learning.

The logical engines provide the basis for which the internal questions are asked. They provide additional awareness of basic logical understandings. Informal logic has many fallacies that are commonly encountered and used for the speaker to accomplish various goals. With an awareness of these fallacies, the Neuric Agent can head them off, and also utilize them to his own advantage.

Conceptual Summaries: As discussed hereinabove, during dialogue, training, and almost any other information exchange process, the brain summarizes the content at a higher level. For example, each experience has starting and ending points, although the starting and ending points may not be sharply defined boundaries.

At the close of the experience (such as a visit to Six Flags), a question may be asked if the expectations were met. The 'experience of Six Flags' is a hierarchical composite of many shorter experiences such as the rides, the crowd, the food, the drenching and laser light show. As each of these sub-experiences completes, the experience and any expectations (fulfilled, unfulfilled?) are summarized, with the summary—highlights—rolled up into the outer experience. From those summaries, questions regarding whether or net expectations were met or unmet can be answered.

In an identical manner, the experiences of dialogue, discussion and conversation in general are captured in clumps. The semantic clumps deal with individual sentences in the exchange, while controller clumps serve to sequence the semantic clumps or otherwise connect them. Above these is an outline clump that contains summaries of the material below.

For example, each paragraph is captured by semantic clumps (SCs), many of which are ultimately discarded as not highly relevant to the person. A conceptual synopsis if the paragraph is recorded by the outline clump that manages the overall paragraph. Yet another level of outline clump summarizes the chapters, and book (if appropriate). Any or all of these clumps that are later deemed not relevant to the person/brain are eventually eliminated, returned to unallocated memory for reuse.

It will be appreciated by those skilled in the art having the benefit of this disclosure that this disclosure provides a process for dialogue and discussion. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

Appendix 1—Argumentation Schemes

In the examples, the following nomenclature is used. Whether presenting or hearing the following arguments, critical questions should be asked. If presenting, predict and record the answers to the questions, so a ready reply can be given when asked. If hearing, evaluate possible questions, choose whichever one poses the greatest threat to the opponent and follow that thread as a method of attack. If no critical questions are available, fall back to the basic questions of evidence ("How do you know that?" "Why is that true?" etc.).

PP1 . . . PPn—Propositions 1 . . . n—Assertions made during the course of the dialogue.

P1 . . . Pn—Premises 1 . . . n—Assumptions made in the questions or statements.

CX1 . . . CXn—Condition—Defines a condition or property.

CQ1 . . . CQn—Critical Questions—Questions that must be asked about the propositions.

C1 . . . Cn—Cases—Cases or situations that exist or may occur

A, B, C—Persons or propositions—Place-holders for persons, things or propositions D1 . . . Dn—Domain—Specific domain such as a domain of expertise.

E1 . . . En—Expert on the subject—An expert in the topic under discussion.

H1 . . . Hn—Hypothesis—An assertion or proposition to be proved or disproved by peers.

V1 . . . Vn—Action (verb)—An action that is or may be taken.

Outbound Argument Processes

Define the purpose of the discussion, which will help select a style of argumentation.

Define purpose of the discussion.

Load premises.

Load the question set (question style set).

Inbound Argument Processes (Questions)

Discussion content is live, with premises that may change dynamically, as may the sub-topic of focus. The issue is to determine what general style of argument is being used.

Determine list of premises in the question.

Determine list of propositions each side is given and their commitment states for each.

Determine legality of premise or proposition.

Determine which style of argument is being asked.

Define list of propositions that each side supports (opposed to which ones they are committed to).

Argument from Sign

Premises:

A is true in this situation.

Event B is generally indicated as true when its sign, A, is true in this kind of situation.

Conclusion:

B is true in this situation.

Critical Questions:

What is the strength of the correlation between A and B.

Are there any events other than B that would more reliably account for A?

Argument from Example

Premises:

In this case, the individual A has property F and also property G.

A is typical of things that have F and may or may not have G.

Conclusion:
Generally, if X has property F then (usually, probably, typically) X also has property G.
Critical Questions:
Is it actually the case that A has F and G?
Does the example of A actually support the general claim: is it really an instance of the generalization?
Is A actually typical of the kinds of cases that the generalization ranges over?
How strong, how widely applicable is the generalization?
Are there special circumstances pertaining to A that impair its generalization?
Argument from Verbal Classification
Premises:
A has a particular property F.
For all X, if x has property F, then X can be classified as having property G.
Conclusion:
A has property G.
Critical Questions:
Does a definitely have F, or is there room for doubt?
Can the verbal classification be said to hold strongly, or is it a weak classification that is subject to doubt?
Argument from Commitment
Premises:
A is committed to proposition PP1.
Conclusion:
In this case, A should support PP1.
Critical Questions:
Is A really committed to PP1, and if so, what evidence supports the claim that A is so committed?
If the evidence for commitment is indirect or weak, could there also be contrary evidence, or at least room for the rebuttal that this case is an exception?
Is the proposition PP1 cited in the premise identical to the proposition PP1 cited in the conclusion? If not, what exactly is the relationship between the two propositions?
Circumstantial Argument Against the Person
Premises:
If A claims that everyone (including A) ought to act in accord with, or support, proposition PP1, then A is, or should be, committed to PP1.
B claims that everyone (including B) ought to act in accord with, or support, proposition PP1.
It is indicated by B's personal circumstances that B is not committed to PP1.
Conclusion:
B is inconsistent in B's commitments, and there should be a weight of presumption against B's argument for B's claim.
Critical Questions:
Does B claim that everyone (including B) ought to act in accord with, or support, PP1?
What is the evidence from B's personal circumstances indicating B is not committed to PP1?
Does it follow from an affirmative answer to question 1 that B is, or should be committed to PP1?
Argument from Position to Know
Premises:
A is in a position to know whether proposition PP1 is true (false).
A assets that PP1 is true (false).
Conclusion:
PP1 is true (false).
Critical Questions:
Is A in a position to know whether proposition PP1 is true (false)?
Is A an honest (trustworthy, reliable) source?
Did A assert that proposition PP1 is true (false)?
Argument from Expert Opinion
In handling the area of expertise, a double-reln is used. If Dr. Patrice is an expert on lumbago, we will have the following relns, permitting us to find experts in a field, and what fields he may have expertise in:
In lumbago, we have the reln pair: {Name=expert, Value=Dr. Patrice}
In Dr. Patrice, we have the reln pair: {Name=expertise, Value=lumbago}
Premises:
E is an expert in domain D.
E asserts that proposition PP1 is known to be true.
Proposition PP1 is within D.
Conclusion:
PP1 may (plausibly) be taken to be true.
Critical Questions:
Is E a genuine expert in D?
Did E really assert that proposition PP1 is known to be true?
Is E's pronouncement directly quoted? If not, is a reference to the original source given? Can it be checked?
If E's advice is not quoted, does it look like important information or qualifications may have been left out?
If more than one expert source has been cited, is each authority quoted separately? Could there be disagreements among the cited experts?
Is what the authority said clear? Are there technical terms used that are not explained clearly? If the advice is in layman's terms, could this be an indication that it has been translated from some other form of expression given by the expert?
Is PP1 relevant to domain D?
Is PP1 consistent with what other experts in D say?
Is PP1 consistent with known evidence in D?
Argument from Evidence to a Hypothesis
Premises:
If hypothesis H1 is true, then a proposition PP1, reporting an event, will be observed to be true.
Proposition PP1 has been observed to be true in a given instance.
Conclusion:
Hypothesis H1 is true.
Critical Questions:
Is it the case that if H1 is true, then proposition PP1 is true?
Has PP1 been observed to be true (false)?
Could there be some other reason why PP1 is true, other than its being because of H1 being true?
Argument from Falsification of a Hypothesis
Premises:
If hypothesis H1 is true, then a proposition PP1, reporting an event, will be observed to be true.
Proposition PP1 has been observed to be false in a given instance.
Conclusion:
Hypothesis H1 is false.
Critical Questions:
Could alternate explanations exist why PP1 is false?
Is it always necessary that if PP1 is false H1 is also false?
Argument from Correlation to Cause
Premises:
There is a positive correlation between condition CX1 and condition CX2.
Conclusion:
Condition CX1 causes CX2.

Critical Questions:

Is there a positive correlation between CX1 and CX2?

Are there a significant number of instances of the positive correlation between CX1 and CX2?

Is there good evidence that the causal relationship goes from CX1 to CX2, and not just from CX2 to CX1?

Can it be ruled out that the correlation between CX1 and CX2 is accounted for by some third factor (a common cause) that causes both CX1 and CX2?

If there are intervening variables, can it be shown that the causal relationship between CX1 and CX2 is indirect (mediated through other causes)?

If the correlation fails to hold outside a certain range of causes, then can the limits of this range be clearly indicated?

Can it be shown that the increase or change in CX2 is not solely due to the way CX2 is defined, the way entities are classified as belonging to the class of CX2s, or changing standards, over time, of the way CX2s are defined or classified?

Argument from Cause to Effect
  Premises:
  Generally, if condition CX1 occurs, then condition CX2 will (or might) occur.
  In this case, CX1 occurs (or might occur).
  Conclusion:
  In this case, CX2 will (or might) occur.
  Critical Questions:
  How strong is the causal generalization (if it is true at all)?
  Is the evidence cited (if there is any) strong enough to warrant the generalization as stated?
  Are there other factors that would or will interfere with or counteract the production of the effect in this case?

Argument from Consequences
  Premises:
  If condition CX1 is brought about, then good (bad) consequences will (may plausibly) occur.
  Conclusion:
  Condition CX1 should (not) be brought about.
  Critical Questions:
  How strong is the likelihood that these cited consequences will (may, must, etc.) occur?
  If condition CX1 is brought about, will (or might) these consequences occur, and what evidence supports this claim?
  Are there consequences of the opposite value that should be taken into account?

Argument from Similarity (Analogy)
  Premises:
  Generally, case C1 is similar to case C2.
  Condition CX1 is true (false) in case C1.
  Conclusion:
  Condition CX1 is true (false) in case C2.
  Critical Questions:
  Are C1 and C2 similar in the respect cited?
  Is CX'1 true (false) in C1?
  Are there differences between C1 and C2 that would tend to undermine the force of the similarity cited?
  Is there some other case C3 that is also similar to C1, but in which A is false (true)?

Argument from Waste
  Premises:
  If A stops trying to obtain condition CX1 now, all A's previous efforts to obtain CX1 will be wasted.
  If all A's previous attempts to obtain CX1 are wasted, that would be a bad thing
  Conclusion:
  A ought to continue trying to obtain condition CX1.
  Critical Questions:
  Are A's attempts to obtain condition CX1 really a negative value to be taken into account in any practical decision on what to do now, or are they simply past events that can no longer be changed?
  Is there sufficient reason to think that if A continues, condition CX1 will occur? In other words, is condition CX1 possible?
  Is there good reason to think that, from this point, the value of obtaining condition CX1 is greater than the disvalue (cost) of continuing the process of attempting to obtain condition CX1?

Argument from Popular Opinion
  Premises:
  If a large majority (everyone, nearly everyone, etc.) accept A as true, then there exists a (defensible) presumption in favor of A.
  A large majority accept A as true.
  Conclusion:
  There exists a presumption in favor of A
  Critical Questions:
  Has the definition of "a large majority" actually been met?

Argument from Popular Practice
  Premises:
  If a large majority (everyone, nearly everyone, etc.) does A, or acts as though A is the right (or an acceptable) thing to do, then A is a prudent course of action.
  A large majority acts as though A is the right thing to do.
  Conclusion:
  A is a prudent course of action.
  Critical Questions:
  Are the premises always true?
  How do you know that?

Morality (Ethotic) Argument
  If a moral person asserts something, it should be accepted as more or less true (plausible). Conversely, if an immoral person asserts something, it should be accepted as less true (or plausible).
  Premises:
  If A is a person of good (bad) moral character, then if A makes proposition PP1, PP1 should be accepted as more (less) plausible
  B is a person of good (bad) moral character.
  Conclusion:
  If B contends proposition PP1, PP1 should be accepted as more (less) plausible.
  Critical Questions:
  Is B a person of good moral character?
  Is the question of B's character relevant, in the context of dialogue in the given case?
  How strong a weight of presumption in favor of PP1 is claimed, and is that strength warranted by the case?

Argument from Bias
  Premises:
  If an arguer A is biased, then it is less likely that A has taken the evidence on both sides of an issue into account in arriving at conclusion PP1.
  Arguer B is biased.
  Conclusion:
  It is less likely that B has taken the evidence on both sides of the issue into account.
  Critical Questions:
  What is the context of dialogue, and in particular, is it a type of dialogue that requires a participant to take evidence on both sides of an issue into account?
  What is the evidence for the charge that B is biased?

Argument from an Established Rule
Premises:
For all A, if doing action V1 is the established rule for x, then (subject to exceptional cases), A must do action V1 (subject to penalty).
Doing action V1 is the established rule for B.
Conclusion:
B must do action V1 (subject to penalty).
Critical Questions:
Is doing action V1 in fact what the rule states?
Does the rule doing action V1 apply in this case?
Is the rule "For all A, A must do action V1" the right rule, or should some other rule be the right one? Could there be more than one rule involved, with some doubt on which is the more appropriate one?
Argument from an Exceptional Case
Premises:
For all A, if doing action V1 is the established rule for A, then if the case of A is an exception, the rule does not apply to the case of A.
Doing action V1 is the established rule for B.
The case of B is an exception.
Conclusion:
B need not do action V1.
Critical Questions:
Is the case of B a recognized type of exception?
If it is not a recognized case, can evidence why the established rule does not apply to it be given?
If it is a borderline case, can comparable cases be cited?
Argument from Precedent
Premises:
The existing rule says that for all X, if X has property F then X has property G
But in this case C1, A has property F, but does not have property G
Conclusion:
The existing rule must be changed, qualified, given up, or a new rule must be introduced to cover case C1.
Critical Questions:
Does the existing rule really say that for all X, if X has F then X has G?
Is case C1 legitimate, or can it be explained away as not really in violation of the existing rule?
Is case C1 an already recognized type of exception that does not require any change in the existing rule?
Argument from Gradualism
Premises:
Proposition A is true (acceptable to the respondent).
There is an intervening sequence of propositions, B1, B2, ..., Bn-1, Bn, C, such that the following conditionals are true: If A then B1; If B1 then B2; ...; If Bn-1 then Bn; If Bn then C.
The conditional 'If A then C' is not, by itself, acceptable to the respondent (nor are any sequences from A to C shorter than the one specified in the second premise).
Conclusion:
Proposition C is true (acceptable to the respondent).
Critical Questions:
Causal Slippery Slope Argument
Premises:
A0 is up for consideration as a proposal that seems initially like something that should be brought about.
Bringing about A0 would plausibly cause (in the given circumstance, as far as we know) A1, which would in turn plausibly cause A2, and so forth, through the sequence A2, ..., An.
An is a horrible (disastrous, bad) outcome.
Conclusion:
A0 should not be brought about.
Critical Questions:
Does the proponent's description of the initial action A0 rightly express the proposal being advocated by the respondent?
Do any of the causal links in the sequence lack solid evidence to back it up as a clausal claim?
Does this outcome plausibly follow from the sequence, and is it as bad as the proponent suggests?
Precedent Slippery Slope Argument
Premises:
Case C0 would set a precedent with respect to an existing rule R.
Case C0 is similar to case C1, that is, if C0 is held to be an exception to R, then C1 must be held to be an exception too (in order to be consistent in treating equal cases alike). A sequence of similar pairs {Ci, Cj} binds us by case-to-case consistency to the series, C0, C1, ... Cn.
Having to accept case Cn as a precedent, or as a recognized exception to R would be intolerable (horrid, bad).
Conclusion:
Admitting case C0, or bringing it forward in the first place, is not a good thing to do.
Critical Questions:
Would case C0 set a precedent?
What is the exact sequence of intervening steps in virtue of which case C0 would lead to Cn?
What is the evidence showing why each of these intervening steps would occur?
Is Cn intolerable, and if so why?
Which are the weakest of the intervening steps, and is the evidence backing them sufficient to warrant the strength of the claim made in the conclusion?
Argument from Vagueness of a Verbal Classification
Premises:
Argument A occurs in a context of dialogue that requires a certain level of precision appropriate.
Some property F that occurs in argument A is defined in a way that is too vague to meet the requirement of the level of precision appropriate for the context of dialogue in which A occurs.
If an argument A occurs in a context of dialogue that requires a certain level of precision, but some property F that occurs in A is defined in a way that is too vague to meet the requirements of that level of precision, then A ought to be rejected as deficient.
Conclusion:
Argument A ought to be rejected as deficient.
Critical Questions:
Does the context of dialogue in which argument A occurs demand some particular level of precision in the key terms used?
Is some property F that occurs in A too vague to meet the proper level or standard of precision?
Why is this degree of vagueness a problem in relation to the dialogue in which A was advanced?
Argument from Arbitrariness of a Verbal Classification
Premises:
Argument A occurs in a context of dialogue that requires a non-arbitrary definition for a key property F that occurs in A.
Some property F that occurs in argument A is defined in a way that is arbitrary.
If an argument A occurs in a context of dialogue that requires a non-arbitrary definition for a key property F that occurs in A, and F is defined in an arbitrary way in A, then A ought to be rejected as deficient.
Conclusion:
Argument A ought to be rejected as deficient.
Critical Questions:
Does the context of dialogue in which argument A occurs require a non-arbitrary definition of F?
Is some property F that occurs in A defined in an arbitrary way?
Why is arbitrariness of definition a problem in relation to the dialogue in which A was advanced?
Verbal Slippery Slope Argument
Premises:
Individual a1 has property F.
For all x and y, if x has F then, if y is indistinguishable for x with respect to F, then y also has F.
For any given pair {ai, aj} of adjacent individuals in the sequence a1, a2, . . . , an, individual aj is indistinguishable from ai with respect to F.
But an does not have property F.
Conclusion:
It is not the case that a1 has F.
Critical Questions:
Does a1 have F?
Is F really vague, in the sense that for all x and y, if x has F, then y must also be conceded to have F?
Are the pairs {ai, aj} in the continuum really indistinguishable from each other?
Is the conclusion that an does not have F truly the case (or at least is the conclusion that an does have F truly unacceptable to the audience)?
Can some precise definition of F be given that will remove the vagueness, sufficiently to stop the slope?
Full Slippery Slope Argument
Premises:
Case C0 is tentatively acceptable as an initial presumption.
There exists a series of cases, C0, C1, . . . , C(n-1), where each case leads to the next by a combination of causal precedent, and/or analogy steps.
There is a climate of social opinion that once people come to accept each step as plausible (or as accepted practice), they will then be led to accept the next step.
The penultimate step C(n-1) leads to a horrible outcome, Cn, which is not acceptable.
Conclusion:
C0 is not acceptable.
Critical Questions:
What are the various sub-arguments or links that make up the intervening steps from C0 to Cn?
How strongly is the conclusion phrased, that is, what is the burden of proof in the dialogue?
Is evidence given to back up each of the sub-arguments, and is it strong enough to meet the requirements of burden of proof?
Deductive Argument from Ignorance
Premises:
All the true propositions in domain D of knowledge are contained in K.
A is in D.
A is not in K.
For all A in D, A is either true or false.
Conclusion:
A is false.
Critical Questions:
Plausible Argument from Ignorance
Premises:
It has not been established that all the true propositions in domain D of knowledge are contained in K.
A is a special type of proposition such that if A were true, A would normally or usually be expected to be in K.
A is in D.
A is not in K.
For all A in D, A is either true or false.
Conclusion:
A is false.
Critical Questions:
What is claimed is:

1. A method for effecting a dialogue with an emulated brain that can receive a query on an input and provide a reply on an output, comprising the steps of:
  receiving a query in the form of a semantic string;
  providing a plurality of neurons, wherein one neuron constitutes a predetermined activity neuron that represents one concept and at least one concept is that of an activity associated with a type of verb;
  defining relational connections between the activity neuron and a second group of the plurality of neurons, each of the second group of the plurality of neurons representing a fixed concept that is unique to the activity associated with the activity neuron;
  wherein the meaning of the activity neuron is determined by a relational connection between the activity neuron and the second group of the plurality of neurons established through the relational connection and wherein the relationship between the activity neuron associated with the concept of activity and the second group of neurons comprises a framework of neurons uniquely related to the at least one concept of the predetermined activity associated with the type of verb associated with that predetermined activity;
  providing a plurality of verb neurons, each representing the concept of an associated verb and each associated neuron defined by a plurality of relationships to other neurons and each having a relationship defined to the activity neuron;
  providing a plurality of neurons associated with other grammatical elements that can be found in a bounded grammatical structure;
  storing the created neurons and associated relationships in a database;
  parsing the semantic string into basic concepts of the query, each concept associated with one of the plurality of neurons, and clumping the basic concepts into a clump concept by the steps of:
    parsing an input bounded grammatical structure to derive the verb associated with the bounded structure and the other associated grammatical elements;
    determining if the verb in the bounded structure is a verb of the type associated with the activity neuron;
    determining which of the relationships from the activity neuron to the associated second group of neurons exists which will define the relationship of the parsed grammatical elements to the parsed verb; and
    creating a clump neuron defining all of the associated neurons for the parsed grammatical structure and the associated relationships as the clump concept;
  storing the clump neuron in the database of neurons;
  determining if the clump concept constitutes part of a dialogue and, if so:
    activating a dialogue thread loop by:
      determining a context of the clump concept;
      assessing a potential reply from a group of expected replies associated with the clump concept, which expected replies are weighted based on the parsed concepts from the step of parsing;

selecting the heaviest weighted one of the expected replies and changing the weight thereof after selection by downgrading the weight of the selected one of expected replies;

generating the selected reply for output in a sentence structure; and outputting the reply.

2. The method of claim 1, wherein the grammatical structure is a sentence.

3. The method of claim 1, wherein the predetermined activity is a transitive activity and the type of verb is a transitive verb.

4. The method of claim 3, wherein the transitive verb constitutes the grammatical role of the verb in the grammatical structure and the second group of neurons defines the restrictions on the transitive verb relative to the other grammatical elements, such that an actor and a recipient if the activity can be defined and attributed their associated roles in the transitory activity.

5. The method of claim 1, wherein the step of creating a clump neuron defining all of the associated neurons for the parsed grammatical structure and the associated relationships as the clump concept defines the grammatical relationships between the neurons in the clump.

* * * * *